US007984230B2

(12) United States Patent
Nasu et al.

(10) Patent No.: US 7,984,230 B2
(45) Date of Patent: Jul. 19, 2011

(54) ALLOCATION OF LOGICAL VOLUMES TO FLASH MEMORY DRIVES

(75) Inventors: Hiroshi Nasu, Yokohama (JP); Masayuki Yamamoto, Sagamihara (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 964 days.

(21) Appl. No.: 11/585,111

(22) Filed: Oct. 24, 2006

(65) Prior Publication Data

US 2008/0065815 A1 Mar. 13, 2008

(30) Foreign Application Priority Data

Sep. 12, 2006 (JP) ................................ 2006-246475

(51) Int. Cl.
*G06F 12/00* (2006.01)
*G06F 13/00* (2006.01)
*G06F 13/28* (2006.01)

(52) U.S. Cl. ...................................................... 711/103

(58) Field of Classification Search .................. 711/103
See application file for complete search history.

(56) References Cited

U.S. PATENT DOCUMENTS

| | | | | |
|---|---|---|---|---|
| 6,529,416 | B2 | 3/2003 | Bruce et al. | |
| 2002/0078335 | A1 * | 6/2002 | Cabrera et al. | 713/1 |
| 2003/0074528 | A1 * | 4/2003 | Soejima et al. | 711/114 |
| 2006/0047924 | A1 * | 3/2006 | Aoshima et al. | 711/161 |
| 2006/0120235 | A1 * | 6/2006 | Jensen | 369/47.1 |

FOREIGN PATENT DOCUMENTS

| | | |
|---|---|---|
| JP | 7325674 | 12/1995 |
| JP | 2003345658 | 12/2003 |

* cited by examiner

*Primary Examiner* — Kevin L Ellis
*Assistant Examiner* — Chad L Davidson
(74) *Attorney, Agent, or Firm* — Brundidge & Stanger, P.C.

(57) ABSTRACT

There is provided a logical volume management method for storage system. When a logical volume is created on a flash memory drive, a management computer allocates logical volume while flash memory chip border of flash memory drive is taken into account. Specifically, a table for managing a correlation between each parity group and the flash memory chip of the flash memory drive is obtained and the logical volume is allocated in such a manner that a flash memory chip is not shared by a plurality of logical volumes. When complete erasing of logical volume data is performed, the management computer specifies a flash memory chip on which complete data erasing is to be performed, and the storage system completely erases data exclusively on the chip of interest with a use of a function of completely erasing data at a time by chip unit of the flash memory chip (chip erasing).

8 Claims, 22 Drawing Sheets

FIG.5

22200 PARITY GROUP TABLE

| PG-ID (22210) | FLASH MEMORY DRIVE ID (22220) | UNALLOCATED FB-ID (22230) | ALLOCATABLE CAPACITY (22240) |
|---|---|---|---|
| PG1 | a1 | ~~FB101, FB102, FB103,~~ FB104, FB105 | 80GB |
| | a2 | ~~FB111, FB112, FB113,~~ FB114, FB115 | |
| | a3 | ~~FB121, FB122, FB123,~~ FB124, FB125 | |
| | a4 | ~~FB131, FB132, FB133,~~ FB134, FB135 | |
| | a5 | ~~FB141, FB142, FB143,~~ FB144, FB145 | |
| PG2 | b1 | ~~FB201, FB202,~~ FB203, FB204, FB205 | 60GB |
| | b2 | ~~FB211, FB212,~~ FB213, FB214, FB215 | |
| | b3 | ~~FB221, FB222,~~ FB223, FB224, FB225 | |
| | b4 | ~~FB231, FB232,~~ FB233, FB234, FB235 | |
| | b5 | ~~FB241, FB242,~~ FB243, FB244, FB245 | |

FIG.6

LOGICAL VOLUME TABLE 22300

| LOGICAL VOLUME-ID (22310) | PG-ID (22320) | FB-ID (22330) | CAPACITY (22340) |
|---|---|---|---|
| v01 | PG1 | FB101, FB111, FB121, FB131, FB141 FB102, FB112, FB122, FB132, FB142 | 30GB |
| v02 | PG1 | FB103, FB113, FB123, FB133, FB143 | 10GB |
| v03 | PG2 | FB201, FB211, FB221, FB231, FB241, FB202, FB212, FB222, FB232, FB242 | 40GB |

FIG.7

42400 SYSTEM TABLE

| SYSTEM ID (42410) | SYSTEM TYPE (42420) | SYSTEM INFORMATION (42430) | IP ADDRESS (42440) |
|---|---|---|---|
| ST1 | STORAGE | VENDOR A, MODEL A1, SERIAL NUMBER 10 | 10.10.10.10 |

LOGICAL VOLUME CREATION SCREEN ~70000

STORAGE SYSTEM NAME: ST1 ~70010

LOGICAL VOLUME INFORMATION:
 CAPACITY: 10 GB ~70020

70030 — CREATE

LOGICAL VOLUME ERASING SCREEN ~80000

LOGICAL VOLUME NAME: v01 ~80010

ERASING MODE: COMPLETE ERASING ▼ — 80020
 REGULAR ERASING
 COMPLETE ERASING

80030 — ERASE

FIG.18

22500 ERASING GROUP TABLE

| SG-ID (22510) | PG-ID (22520) | FB-ID (22530) | ALLOCATABLE CAPACITY (22540) | RETENTION PERIOD (22550) |
|---|---|---|---|---|
| SG11 | PG1 | FB101, FB111, FB121, FB131, FB141, FB102, FB112, FB122, FB132, FB142, FB103, FB113, FB123, FB133, FB143 | 30GB | UNTIL 2007 |
| SG12 | PG1 | FB104, FB114, FB124, FB134, FB144, FB105, FB115, FB125, FB135, FB145 | 20GB | UNTIL 2008 |
| SG21 | PG2 | FB201, FB211, FB221, FB231, FB241 | 0GB | UNTIL 2009 |

| LOGICAL VOLUME -ID (22910) | SG-ID (22950) | CAPACITY (22940) |
|---|---|---|
| v11 | SG11 | 10GB |
| v12 | SG11 | 20GB |
| v13 | SG12 | 20GB |
| v14 | SG21 | 10GB |

ERASING GROUP FORMATION SCREEN ~71000

STORAGE SYSTEM NAME : [ ST1 ] ~71010

ERASING GROUP INFORMATION :
- CAPACITY : [ 60 ] GB ~71020
- RETENTION PERIOD : [ 1 ] YEARS ~71030

71040 ~ [ FORM ]

LOGICAL VOLUME CREATION SCREEN ~72000

STORAGE SYSTEM NAME : [ ST1 ] ~72010

LOGICAL VOLUME INFORMATION :
- CAPACITY : [ 10 ] GB ~72020
- RETENTION PERIOD : [ UNTIL 2007 ▼ ] ~72030
  - UNTIL 2007
  - UNTIL 2008
  - UNTIL 2009

72040 ~ [ CREATE ]

LOGICAL VOLUME BATCH ERASING SCREEN ~81000

ERASING GROUP NAME : [ SG11 ] ~81010

81020 ~ [ ERASE ]

ALLOCATION OF LOGICAL VOLUMES TO FLASH MEMORY DRIVES

CROSS-REFERENCE TO RELATED APPLICATIONS

This application claims the foreign priority benefit under Title 35, United States Code, section 119 (a)-(d), of Japanese Patent Application No. 2006-246475, filed on Sep. 12, 2006 in the Japan Patent Office, the disclosure of which is herein incorporated by reference in its entirety.

BACKGROUND OF THE INVENTION

1. Field of the Invention

The present invention relates to a logical volume management method and a logical volume management program of a storage system used for a computer system, and a computer system.

2. Description of the Related Art

A storage system generally includes randomly accessible nonvolatile storage media, such as magnetic disk and optical disk. The most common storage system at present has many compact-size disk drives. On the other hand, as semiconductor technology advances, there has been developed a nonvolatile semiconductor memory that can retain data even after turning off a power supply and in which batch erasing can be performed (i.e. all data can be erased at a time).

Among nonvolatile semiconductor memories on which batch erasing can be performed, there can be mentioned a flash memory and EEPROM (Electrically Erasable Programmable Read Only Memory). In these nonvolatile memories, complete erasing of data on a chip (i.e. a complete erasing function) can be implemented by electrically erasing data at a time on the basis of chip unit on the memory (i.e. performing chip erasing). The flash memory is a semiconductor memory that is nonvolatile and readable like a read only memory (ROM), yet writable like a random access memory (RAM). The storage system having flash memories as storage media is excellent in service life, power-saving, access time and the like as compared with a storage system having many compact-size disk drives.

U.S. Pat. No. 6,529,416, which is incorporated herein by reference, discloses a technique in which a flash memory drive having a plurality of flash memories that are accessible by a conventional access means such as a hard disk drive in SCSI and the like, is used instead of the hard disk drive of a storage system.

In a computer system, complete erasing of data on a storage system is often performed, for the purpose of preventing leakage of personal data or business data that a company possesses. Data once stored on a hard disk included in a storage system cannot be completely erased by a standard erasing function provided in an OS or formatting of a hard disk. In order to perform complete erasing of data on the hard disk, overwriting of fixed pattern data should be repeated several times.

In the computer system disclosed in the above-mentioned patent document in which a flash memory drive is used instead of the hard disk drive of the storage system, in order to perform complete erasing of data on a logical volume allocated to the flash memory drive, overwriting of data on the flash memory drive should be repeated several times.

In addition, a data write speed onto a flash memory that included in a flash memory drive is slower than that onto a hard disk. Therefore, when overwriting of data is repeated several times, there arises a problem that a time period for performing complete erasing of logical volume on the flash memory drive becomes longer than a time period for performing complete erasing of logical volume on the conventional hard disk.

Further, a flash memory has a limitation in data rewrite count. When overwriting of data is repeated several times and complete erasing of logical volume on a flash memory drive is repeatedly performed, there arises a problem that a possible count of data rewriting of flash memory drive is wasted.

Therefore, it would be desirable to provide a method for logical volume management of a storage system, a logical volume management program and a computer system, that can reduce a time period for performing complete erasing of logical volume on a flash memory drive, and further can reduce rewrite count on a flash memory upon performing complete data erasing.

SUMMARY OF THE INVENTION

In an aspect of the present invention, there is provided a logical volume management method for a computer system comprising: at least one host computer; and at least one storage system having at least one physical storage device-chip as storage medium with a complete data erasing function and providing at least one logical volume to the host computer, the host computer and the storage system being connected with each other through a network, the method comprising steps of: allowing the host computer: to allocate a logical volume requested in a logical volume creation request to unallocated physical storage device-chip if the host computer receives the logical volume creation request, and if a storage capacity of the logical volume requested in the logical volume creation request is equal to or smaller than a total storage capacity of the unallocated physical storage device-chip; and to send the storage system a logical volume erasing request if the host computer receives the logical volume erasing request, and allowing the storage system: to perform complete data erasing on the physical storage device-chip to which the logical volume to be erased included in the logical volume erasing request is allocated, by using the complete data erasing function, if a logical volume erasing-mode selection included in the logical volume erasing request is complete data erasing; and to cancel a correlation between the logical volume to be erased included in the logical volume erasing request and the physical storage device-chip if the logical volume erasing-mode selection included in the logical volume erasing request is not complete data erasing, by deleting an entry of the logical volume to be erased on a logical volume management table for managing the correlation therebetween.

In another aspect of the present invention, there is provided a logical volume management method for a computer system comprising: at least one host computer; and at least one storage system having at least one physical storage device-chip as storage medium with a complete data erasing function and providing at least one logical volume to the host computer, the host computer and the storage system being connected with each other through a network, the method comprising steps of: allowing the host computer: to allocate an erasing group requested in an erasing group formation request with a retention period for forming an erasing group that can be erased at a time on an expiration of the data retention period to unallocated physical storage device-chip if the host computer receives the erasing group formation request with a retention period, and if a storage capacity of the erasing group requested in the erasing group formation request with a retention period is equal to or smaller than a total storage capacity of the unallocated physical storage device-chip; and to allocate a logical volume requested in a logical volume creation request to unallocated physical storage device-chip if the host computer receives the logical volume creation request with a predetermined data retention period, and if a creation capacity of the logical volume included in the logical volume creation request is equal to or smaller than a logical-volume-unallocated capacity of the physical storage device-chip having a retention period of data stored in the erasing group that matches the retention period included in the logical volume creation request; and to send the storage system a logical volume erasing request if the host computer receives the logical volume erasing request, and allowing the storage system: to perform complete data erasing on the physical storage device-chip to which the logical volume included in the logical volume erasing request is allocated, by using the complete data erasing function, if the data retention period of logical volume included in the logical volume erasing request is expired.

In still another aspect of the present invention, there is provided a logical volume management method for a computer system comprising: at least one host computer; and at least one storage system having at least one physical storage device-chip as storage medium with a complete data erasing function, and providing at least one logical volume to the host computer, the host computer and the storage system being connected with each other through a network, the method comprising steps of: allowing the host computer: to allocate a logical volume requested in a logical volume creation request to unallocated physical storage device-chip if the host computer receives the logical volume creation request, and if a storage capacity of the logical volume requested in the logical volume creation request is equal to or smaller than a total storage capacity of the unallocated physical storage device-chip.

In still another aspect of the present invention, there is provided a logical volume management method for a computer system comprising: at least one host computer; and at least one storage system having at least one physical storage device-chip as storage medium with a complete data erasing function, and providing at least one logical volume to the host computer, the host computer and the storage system being connected with each other through a network, the method comprising steps of: allowing the host computer: to allocate an erasing group requested in an erasing group formation request with a retention period for forming an erasing group that can be erased at a time on an expiration of the data retention period to unallocated physical storage device-chip if the host computer receives the erasing group formation request with a retention period, and if a storage capacity of the erasing group requested in the erasing group formation request with a retention period is equal to or smaller than a total storage capacity of the unallocated physical storage device-chip.

In still another aspect of the present invention, there is provided a logical volume management computer-readable media for a computer system comprising: at least one host computer; and at least one storage system having at least one physical storage device-chip as storage medium with a complete data erasing function and providing at least one logical volume to the host computer, the host computer and the storage system being connected with each other through a network, the computer-readable media having instructions executable by the host computer or a computer of the storage system for performing steps of: receiving a logical volume creation request; and allocating a logical volume requested in the logical volume creation request to unallocated physical storage device-chip if a storage capacity of the logical volume requested in the logical volume creation request is equal to or smaller than a total storage capacity of the unallocated physical storage device-chip.

In still another aspect of the present invention, there is provided a logical volume management computer-readable media for a computer system comprising: at least one host computer; and at least one storage system having at least one physical storage device-chip as storage medium with a complete data erasing function and providing at least one logical volume to the host computer, the host computer and the storage system being connected with each other through a network, the computer-readable media having instructions executable by the host computer or a computer of the storage system for performing steps of: receiving an erasing group formation request with a retention period for forming an erasing group that can be erased at a time on an expiration of the data retention period; and allocating the erasing group requested in the erasing group formation request with a retention period to unallocated physical storage device-chip if a storage capacity of the erasing group requested in the erasing group formation request with a retention period is equal to or smaller than a total storage capacity of the unallocated physical storage device-chip.

In still another aspect of the present invention, there is provided a computer system comprising: at least one host computer; and at least one storage system providing at least one logical volume to the host computer, the host computer and the storage system being connected with each other through a network, wherein the storage system has at least one physical storage device-chip as storage medium with a complete data erasing function, and the host computer allocates a logical volume requested in a logical volume creation request to unallocated physical storage device-chip if the host computer receives the logical volume creation request, and if a storage capacity of the logical volume requested in the logical volume creation request is equal to or smaller than a total storage capacity of the unallocated physical storage device-chip.

In still another aspect of the present invention, there is provided a computer system comprising: at least one host computer; and at least one storage system providing at least one logical volume to the host computer, the host computer and the storage system being connected with each other through a network, wherein the storage system has at least one physical storage device-chip as storage medium with a complete data erasing function, and the host computer allocates an erasing group requested in an erasing group formation request with a retention period for forming an erasing group that can be erased at a time on an expiration of the data retention period to unallocated physical storage device-chip if the host computer receives the erasing group formation request with a retention period, and if a storage capacity of the erasing group requested in the erasing group formation request with a retention period is equal to or smaller than a total storage capacity of the unallocated physical storage device-chip.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 5 is an explanatory diagram showing one example of a parity group table that manages unallocated FBs in the storage system.

FIG. 6 is an explanatory diagram showing one example of a logical volume table that manages logical volumes in the storage system.

FIG. 7 is an explanatory diagram showing one example of a system table included in the management computer.

FIG. 18 is an explanatory diagram showing one example of an erasing group table that manages erasing groups in the storage system.

FIG. 19 is an explanatory diagram showing a logical volume table that manages logical volumes in the storage system.

DETAILED DESCRIPTION OF THE EXEMPLARY EMBODIMENTS

Embodiments of the present invention will be described in detail below with reference to the drawings. It should be not be construed that the present invention is limited to these embodiments.

Embodiment 1

A configuration of a computer system according to Embodiment 1 of the present invention will be described below.

Figure 1:
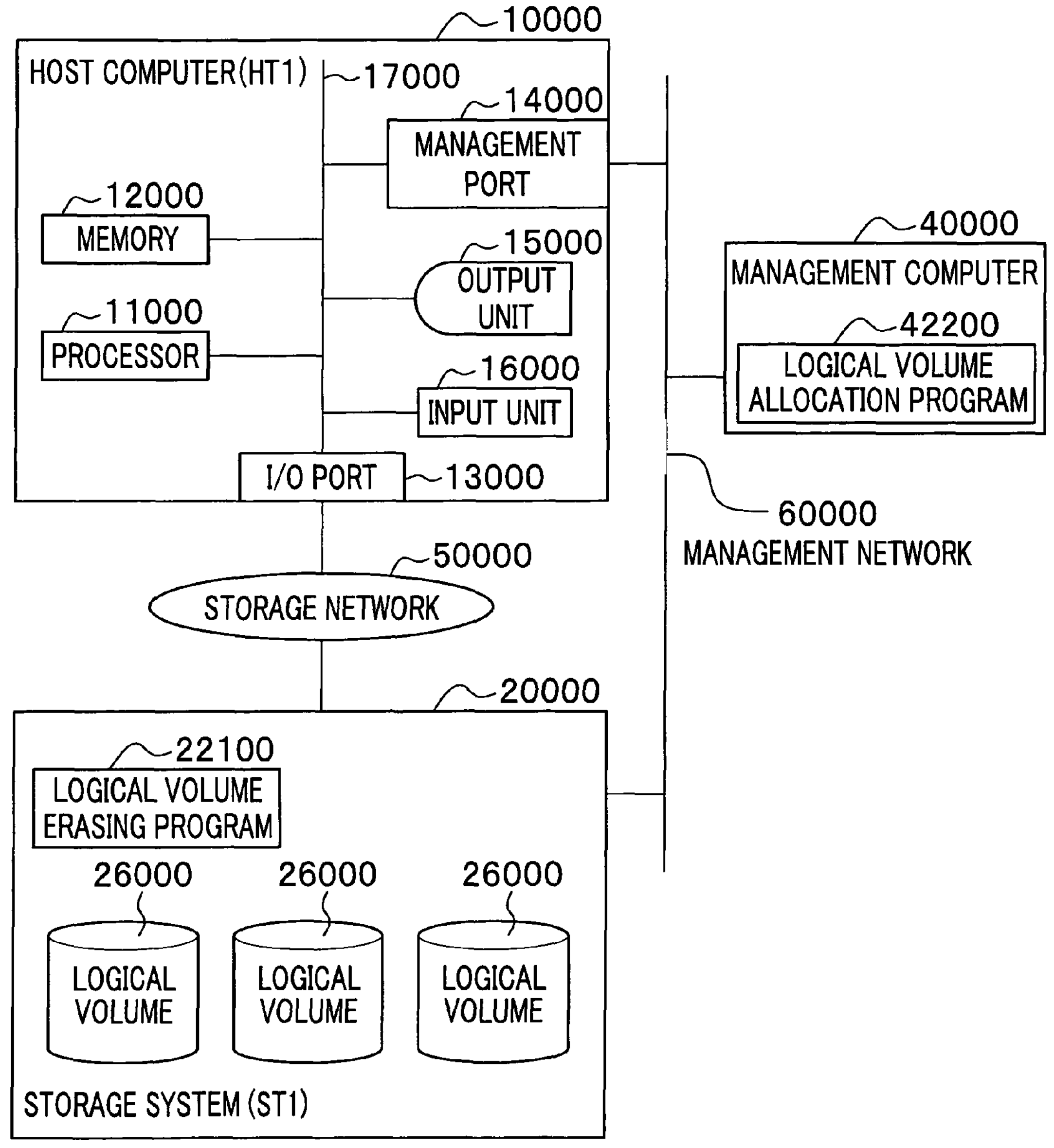
FIG. 1 is a block diagram showing a configuration of a computer system according to Embodiment 1.

FIG. 1 is a block diagram showing a configuration of a computer system according to Embodiment 1. One or more host computers 10000 and one or more storage systems 20000 are connected with each other through a storage network 50000.

The host computer 10000 includes: a processor 11000; a memory 12000; one or more I/O ports 13000 for connecting with the storage network 50000; a management port 14000 for connecting with a management network 60000; an output unit 15000, such as display device, for outputting processing results; and an input unit 16000, such as keyboard and mouse. These are connected with one another through an internal bus 17000. The memory 12000 stores an OS (not shown) and an application (not shown) for processing associated with data access to the storage system 20000. These programs are read from storage media (not shown), such as hard disk drives, and executed by the processor 11000.

The storage system 20000 stores a logical volume erasing program 22100 and logical volumes 26000. The detailed configuration will be described later. A management computer 40000 includes a logical volume allocation program 42200. The detail will be described later.

For convenience of explanation, in Embodiment 1, it is assumed that the host computer (HT1) 10000 is connected to the storage system (ST1) 20000 through the storage network 50000; the storage network 50000 is a network using an FC (Fibre Channel) protocol; and the management network 60000 is a network using a TCP/IP protocol.

Figure 2A:
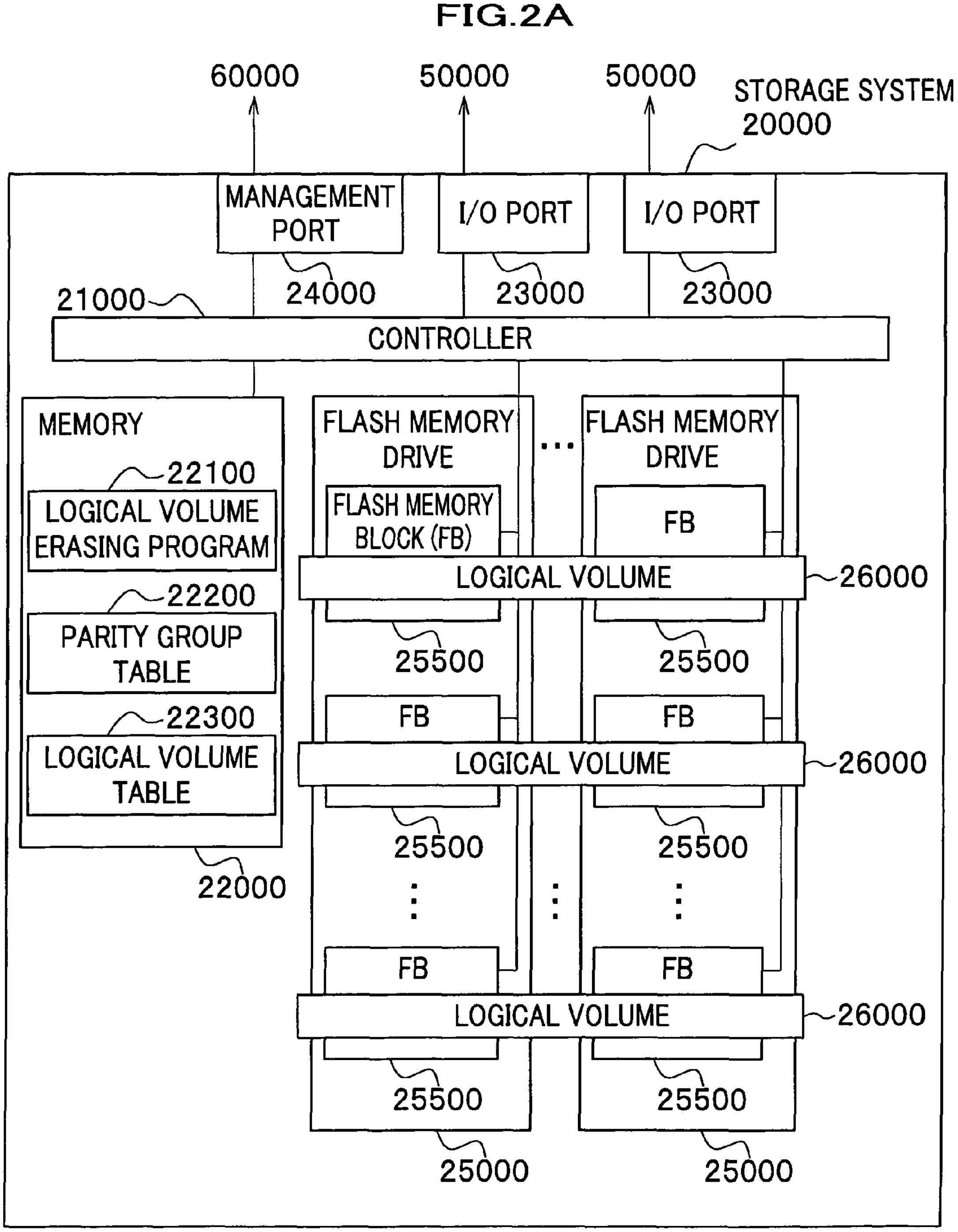
FIG. 2A is a block diagram showing a configuration of a storage system according to Embodiment 1.

FIG. 2A is a block diagram showing a configuration of a storage system according to Embodiment 1. The storage system 20000 includes: a controller 21000 for controlling components in the storage system 20000; a memory 22000; one or more I/O ports 23000 for connecting with the storage network 50000; a management port 24000 for connecting with the management network 60000; and one or more flash memory drives 25000 having one or more flash memory blocks 25500 (hereinafter simply referred to as "FB"), and provides one or more logical volumes 26000 as storage areas to the host computer 10000 (see FIG. 1). The FB 25500 has one or more flash memory chips 25510 on which data can be electrically erased at a time. When the storage system 20000 performs complete erasing of data in FB 25500, data on the flash memory chips 25510 included in the FB 25500 is electrically erased (i.e., erased by chip erasing).

The storage system 20000 stores data written/read by the host computer 10000 in RAID (Redundant Arrays of Inexpensive Disks) using plural hard disk drives or a physical storage area of a single hard disk drive included in the storage system 20000, which is associated with a logical volume 26000. In the present embodiment, the logical volume 26000 employs a RAID configuration using a plurality of flash memory drives 25000 constituting a parity group, stored on the storage system 20000.

The memory 22000 stores a logical volume erasing program 22100. An operation of the logical volume erasing program 22100 will be described later. In addition, the memory 22000 stores a parity group table 22200 for managing a correlation between the parity group and the flash memory drive, and a logical volume table 22300 for managing a correlation between the logical volume 26000 and the FB 25500. These tables and the program are read from storage media (not shown), such as the hard disk drives, upon starting the storage system 20000. It should be noted that, in the present embodiment, the number of I/O ports 23000, the number of flash memory drives 25000, the number of FBs 25500, the number of logical volumes 26000 and the capacity may be determined depending on a specification of the computer system.

Figure 2B:
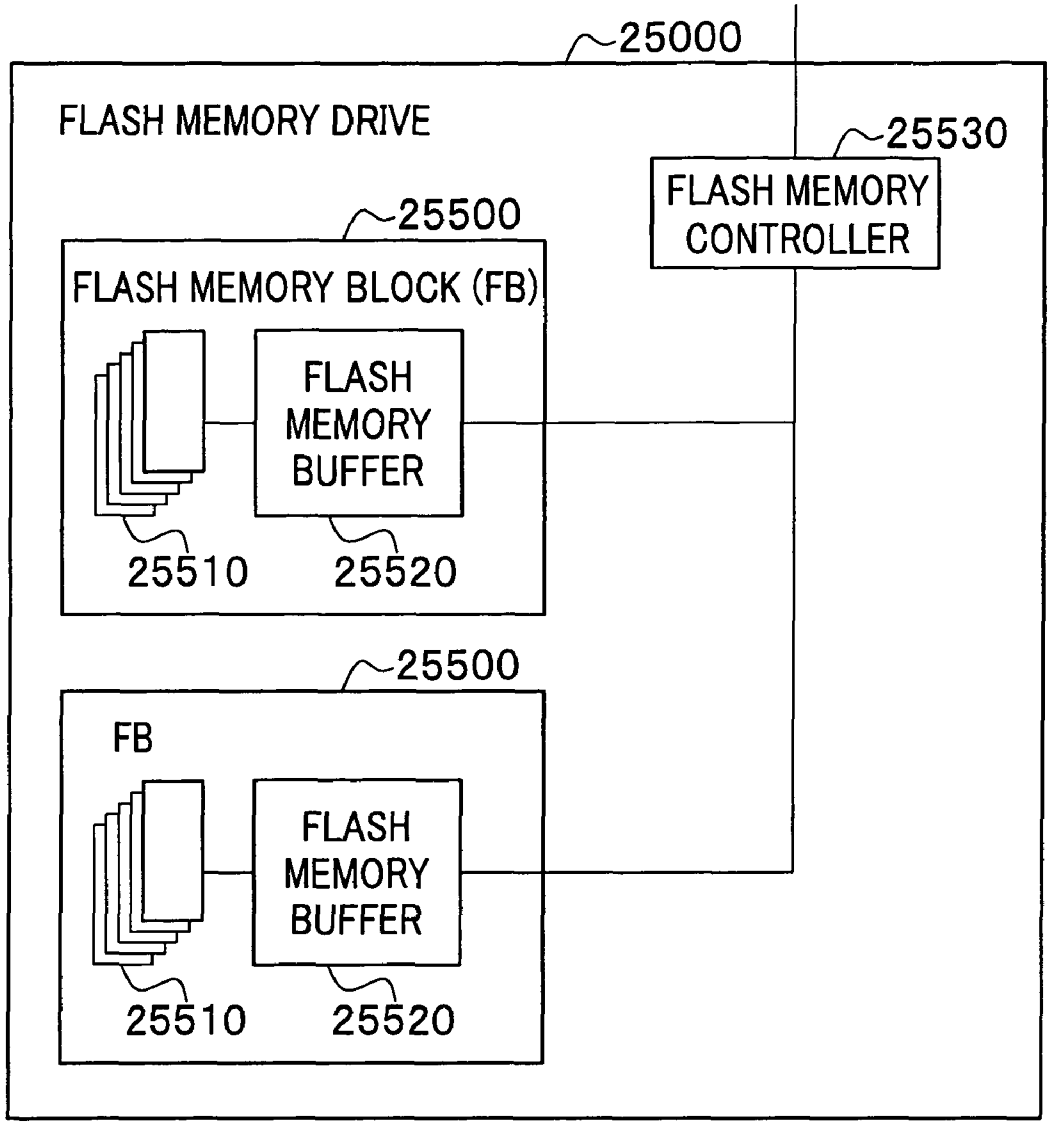
FIG. 2B is a block diagram showing a configuration of a flash memory drive according to Embodiment 1.

FIG. 2B is a block diagram showing a configuration of a flash memory drive according to Embodiment 1. The flash memory drive 25000 includes: a flash memory controller 25530 for controlling the flash memory drive 25000; and one or more FBs 25500. The flash memory controller 25530 is connected to each FB 25500 through an internal bus. The FB 25500 includes one or more flash memory chips 25510 and a flash memory buffer 25520 which is connected to each flash memory chip 25510 through an internal bus. When the flash memory buffer 25520 receives an instruction for erasing data on the chips in the FB 25500 from the flash memory controller 25300, a voltage is applied to all memory cells in each flash memory chip 25510 to set data on the memory cell as "1", to thereby perform complete erasing of data on all flash memory chips 25510 included in the FB 25500.

Figure 3:
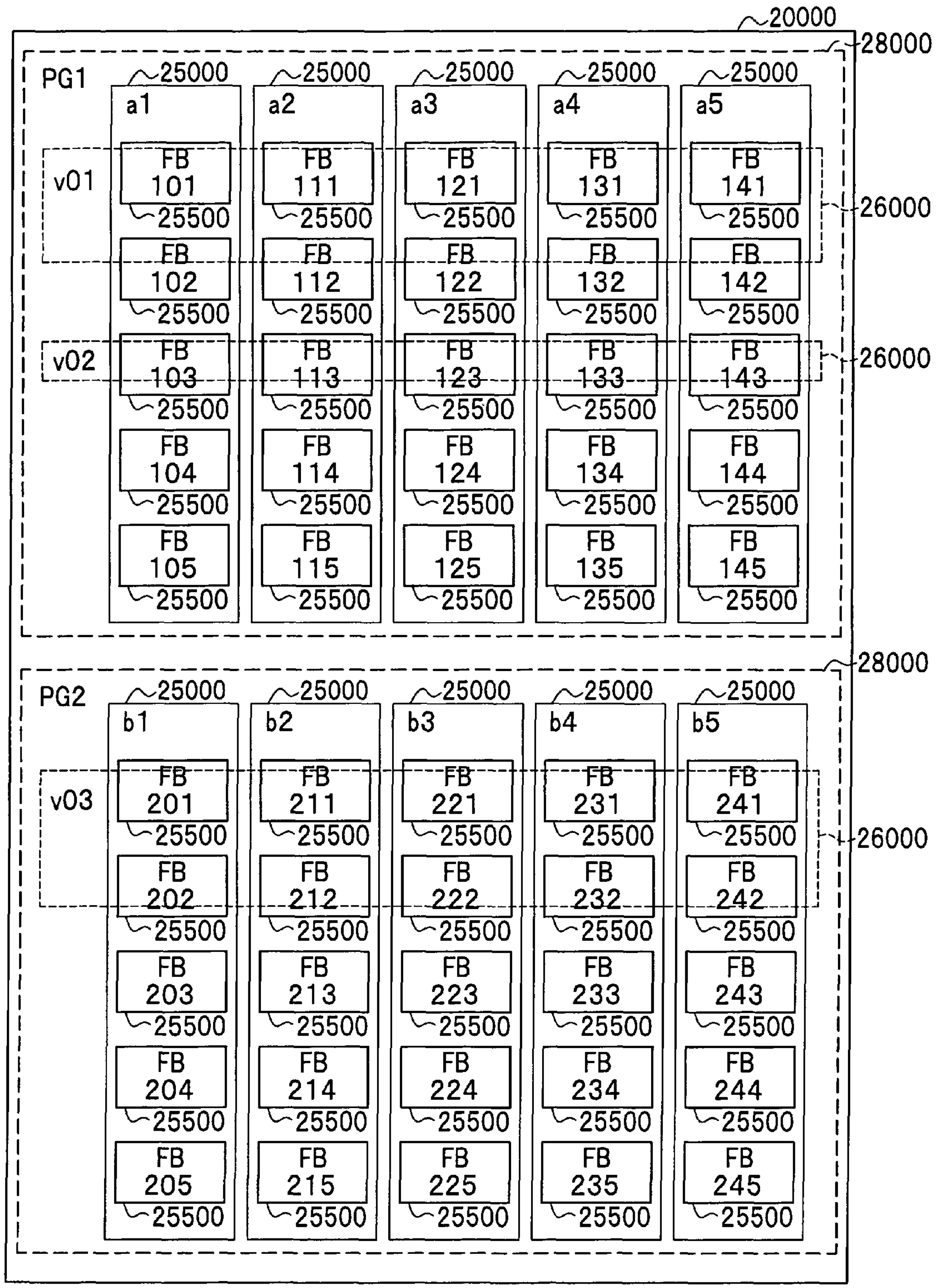
FIG. 3 is an explanatory diagram showing a relationship between flash memory blocks (FBs) included in each flash memory drive which belongs to a corresponding parity group, and logical volumes.

FIG. 3 is an explanatory diagram showing a relationship between flash memory blocks (FBs) included in each flash memory drive which belongs to a corresponding parity group, and logical volumes. In this case, each flash memory drive 25000 is identified by a flash memory drive ID, and treated as one group. Specifically, a flash memory drive a1 of the flash memory drive 25000 includes FB101, FB102, FB103, FB104 and FB105. Likewise, a flash memory drive a2 includes FB111, FB112, FB113, FB114 and FB115. A flash memory drive a3 includes FB121, FB122, FB123, FB124 and FB125. A flash memory drive a4 includes FB131, FB132, FB133, FB134 and FB135. A flash memory drive a5 includes FB141, FB142, FB143, FB144 and FB145.

A flash memory drive b1 includes FB201, FB202, FB203, FB204 and FB205. A flash memory drive b2 includes FB211, FB212, FB213, FB214 and FB215. A flash memory drive b3 includes FB221, FB222, FB223, FB224 and FB225. A flash memory drive b4 includes FB231, FB232, FB233, FB234 and FB235. A flash memory drive b5 includes FB241, FB242, FB243, FB244 and FB245.

Each parity group 28000 is identified by a parity group ID (PG-ID), and treated as one group. Specifically, a parity group PG1 is constituted by the flash memory drives 25000, including the flash memory drives a1, a2, a3, a4 and a5. Likewise, a parity group PG2 includes the flash memory drives 25000, including the flash memory drives b1, b2, b3, b4 and b5.

In the hardware configuration as shown in FIG. 3, logical volumes are created. For example, a logical volume v01 which belongs to the parity group PG1 shown in FIG. 3 is allocated to FB101, FB102, FB111, FB112, FB121, FB122, FB131, FB132, FB141 and FB142 among FB 25500. A logical volume v02 which belongs to the parity group PG1 is allocated to FB103, FB113, FB123, FB133 and FB143 among FBs 25500. A logical volume v03 which belongs to the parity group PG2 is allocated to FB201, FB202, FB211, FB212, FB221, FB222, FB231, FB232, FB241 and FB242 among FBs 25500. Other FBs 25500, that is, FB104, FB105, FB114, FB115, FB124, FB125, FB134, FB135, FB144, FB145 which belong to the parity group PG1, are unallocated FB to which no logical volume is allocated. FB203, FB204, FB205, FB213, FB214, FB215, FB223, FB224, FB225, FB233, FB234, FB235, FB243, FB244 and FB245 among FBs 25500 which belong to the parity group PG2, are unallocated FBs to which no logical volume is allocated. It should be noted that the relationships among the parity group (PG), the flash memory drive 25000 and the flash memory block (FB) 25500 will be described later in reference to FIG. 5. The relationships among the logical volume 26000, the parity group (PG) and the flash memory block (FB) will be described later in reference to FIG. 6.

Figure 4:
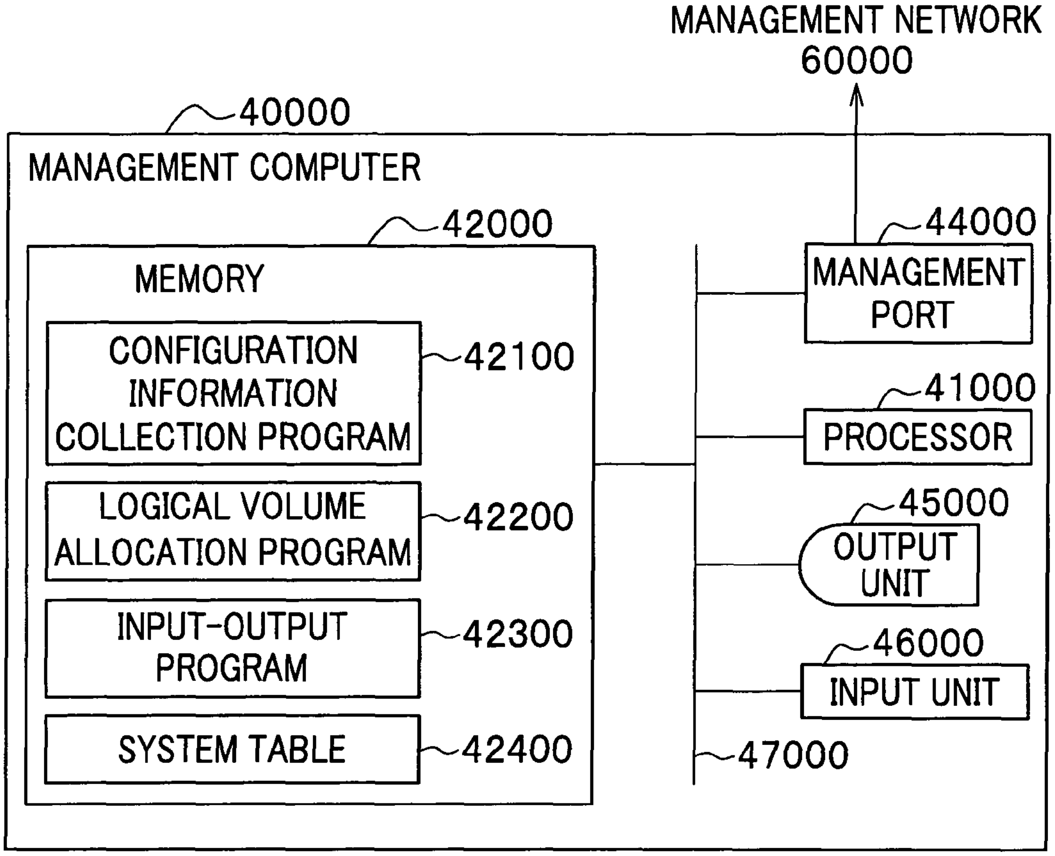
FIG. 4 is a block diagram showing a configuration of a management computer according to Embodiment 1.

FIG. 4 is a block diagram showing a configuration of a management computer according to Embodiment 1. The management computer 40000 includes: a processor 41000; a memory 42000; a management port 44000 for connecting with the management network 60000; an output unit 45000, such as display device, for outputting processing results; and an input unit 46000, such as keyboard and mouse. These are connected with one another through an internal bus 47000.

The memory 42000 includes: a configuration information collection program 42100 for collecting configuration information and performing configuration settings for the storage system 20000 (detailed flow is not shown); the logical volume allocation program 42200 for allocating logical volumes on the flash memory drive 25000 in the storage system 20000; an input-output program 42300 for controlling input and output through the input unit 46000 and the output unit 45000 of the management computer 40000 (detailed flow is not shown); and a system table 42400 for the management computer 40000 to specify the host computer 10000 and the storage system 20000 to be managed. These programs and table are read from storage media (not shown), such as hard disk drives, onto the memory 42000, and executed by the processor 41000. In addition, though not shown, an OS (operating system) is read from the storage media onto the memory 42000, and the processor 41000 executes these programs.

FIG. 5 is an explanatory diagram showing one example of a parity group table that manages unallocated FBs in the storage system. The parity group table 22200 is a table showing relationships among the parity group (PG), the flash memory drive and the flash memory block (FB) shown in FIG. 3. The parity group table 22200 includes: a PG-ID field 22210 for registering ID of PG as a unique identifier for the parity group in the storage system 20000; a flash memory drive ID field 22220 for registering ID of the flash memory drive 25000 as a unique identifier for the flash memory drive 25000 corresponding to the parity group 28000; an unallocated FB-ID field 22230 for registering ID of the FB 25500 as a unique identifier for the FB to which no logical volume is allocated, among FBs 25500 included in the flash memory drive 25000; and an allocatable capacity field 22240 for indicating logical volume-allocatable capacity. In FIG. 5, an FB-ID cancelled with a double line in the unallocated FB-ID field 22230 indicates that a logical volume 26000 is already allocated to the FB 25500 of that ID.

Specifically in this embodiment, the parity group PG1 includes the flash memory drives a1, a2, a3, a4 and a5 among the flash memory drives 25000. The flash memory drive a1 includes FB101, FB102, FB103, FB104 and FB105 among FBs 25500. Among these, a logical volume 26000 is already allotted to FB101, FB102 and FB103 while FB104 and FB105 are unallocated FB. Since a similar explanation to this flash memory drive is applied to the following flash memory drives, a duplicate description is omitted. The parity group PG1 has an allocatable capacity of 80 GB, and the parity group PG2 has an allocatable capacity of 60 GB.

FIG. 6 is an explanatory diagram showing one example of a logical volume table that manages logical volumes in the storage system. The logical volume table 22300 is a table showing relationships among the logical volume 26000, the parity group and the flash memory drive shown in FIG. 3. The logical volume table 22300 includes: a logical volume-ID field 22310 for registering ID of the logical volume as a unique identifier for the logical volume 26000 in the storage system 20000; a PG-ID field 22320 for registering ID of the parity group corresponding to the logical volume; the FB-ID field 22330 for registering ID of the FB as a unique identifier for the FB to which logical volume is allocated; and a capacity 22340 for indicating a capacity of the logical volume.

Specifically in this embodiment, the logical volume v01 which belongs to the parity group PG1 is allocated to FB101, FB102, FB111, FB112, FB121, FB122, FB131, FB132, FB141 and FB142. The logical volume v01 has a capacity of 30 GB. Likewise, the logical volume v02 which belongs to the parity group PG1 is allocated to FB103, FB113, FB123, FB133 and FB143. The logical volume v02 has a capacity of 10 GB. The logical volume v03 which belongs to the parity group PG2 is allocated to FB201, FB202, FB211, FB212, FB221, FB222, FB231, FB232, FB241 and FB242. The logical volume v03 has a capacity of 40 GB.

FIG. 7 is an explanatory diagram showing one example of a system table included in the management computer. The system table 42400 is used for specifying the storage system 20000 to which the logical volume allocation program 42200 in the management computer 40000 (see FIG. 4) is applied. The system table 42400 includes: a system ID field 42410 for registering a system ID for the computer to uniquely identify storage system in the computer system; a system type field 42420 for registering a type of the system; a system information field 42430 for registering detailed information, such as vendor name, model name and serial number of the system; and an IP address field 42440 for registering IP address to communicate with the management port of the system. It should be noted that these pieces of information may be registered in advance by the system manager from the management computer 40000. Alternatively the information may be automatically generated using name services or the like on the storage network or the management network. These are the configuration of the computer system of Embodiment 1.

Next, as an overview of an operation of the management computer 40000 in Embodiment 1, a logical volume allocation process will be explained with reference to FIGS. 8 and 10.

Figure 8:
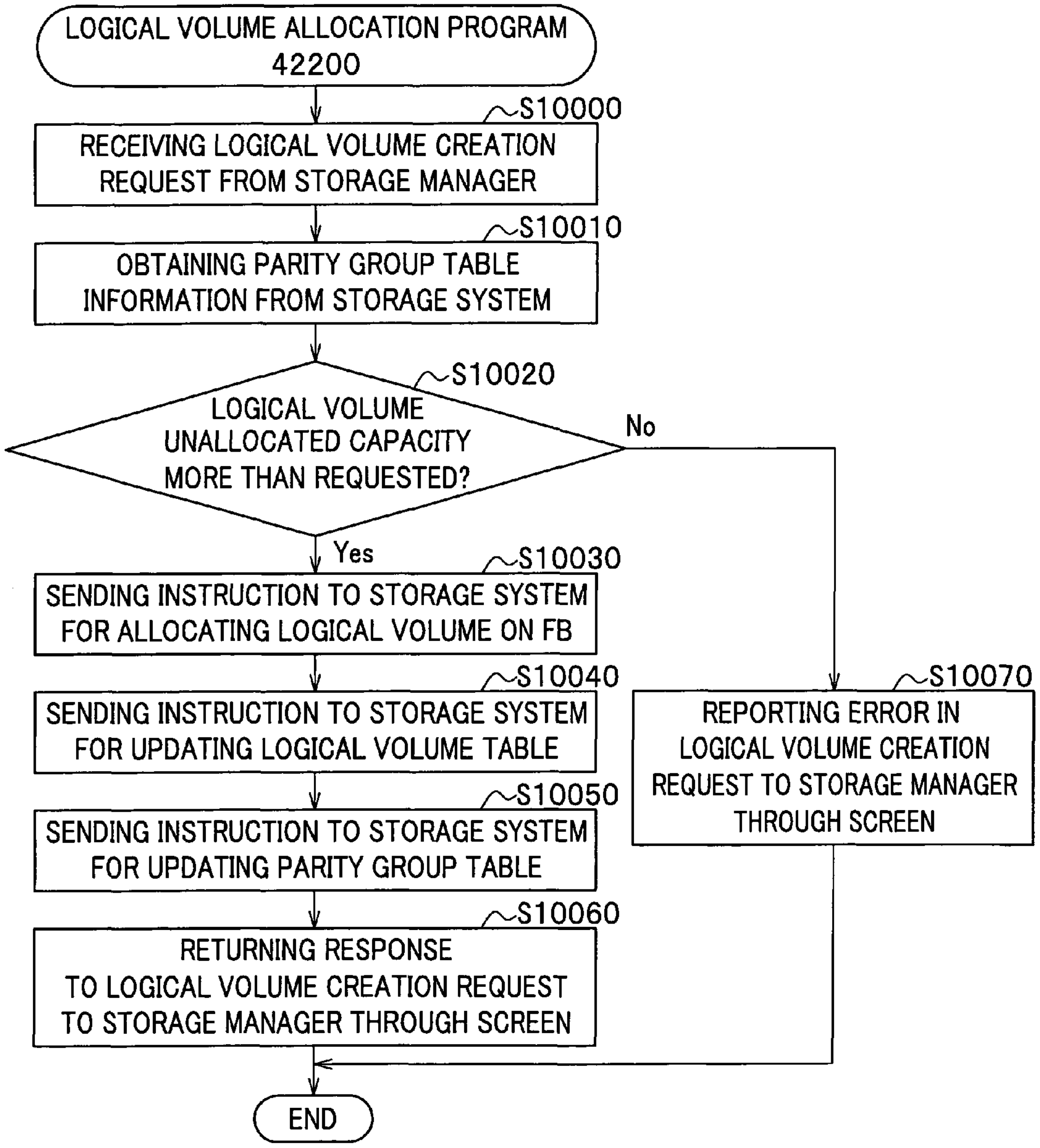
FIG. 8 is a flow chart showing an operation of a processor using a logical volume allocation program.

FIG. 8 is a flow chart showing an operation of a processor using a logical volume allocation program. FIG. 10 is an explanatory diagram showing an example of a logical volume creation screen displayed on an input unit of a management computer.

Figure 10:
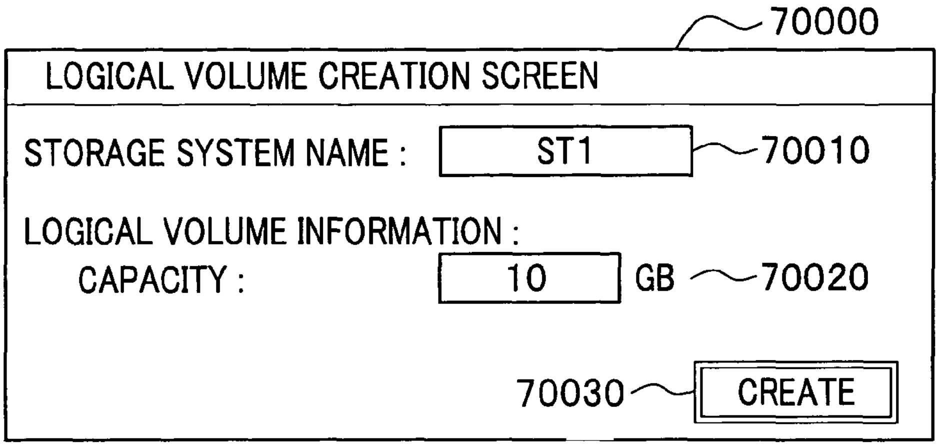
FIG. 10 is an explanatory diagram showing an example of a logical volume creation screen displayed on an input unit of a management computer.

Using an input-output program, the processor 41000 (see FIG. 4) displays a logical volume creation screen 70000 as shown in FIG. 10. The logical volume creation screen 70000 includes: a system name input field 70010 for inputting a storage system name in which logical volume is created; a capacity input field 70020 for inputting a capacity of the logical volume; and a CREATE button 70030 for sending a logical volume creation request to the storage system 20000 based on the value inputted in the capacity input field 70020.

A storage manager inputs data into the system name field 70010 and clicks the CREATE button 70030. For example, when the storage manager inputs parameters on the logical volume creation screen 70000 shown in FIG. 10 and sends a request for creating logical volume, the processor 41000 creates a logical volume having a capacity of 10 GB in the storage system ST1.

In a step S10000 shown in FIG. 8, the processor 41000 receives a logical volume creation request (including configuration information, such as a storage system name and a logical volume capacity) inputted by the storage manager through the logical volume creation screen 70000, and the procedure advances to a step S10010. In the step S10010, the processor 41000 obtains parity group table information including unallocated FB-IDs and logical volume-allocatable capacities from the storage system 20000, and the procedure advances to a step S10020.

In the step S10020, the processor 41000 judges whether or not the logical volume having the capacity received in the step S10000 is allocatable in the storage system 20000. In other words, the processor 41000 judges whether or not a capacity to which logical volume is not allocated is more than the requested capacity. When the value of the logical volume capacity received in the step S10000 is equal to or smaller than the value of the logical volume-allocatable capacity obtained in the step S10010 (Yes in the step S10020), the logical volume is judged as being allocatable, and the procedure advances to a step S10030.

In the step S10030, the processor 41000 sends an instruction to the storage system 20000 for allocating the logical volume having the capacity received in the step S10000 to the unallocated FB received in the step S10010, and the procedure advances to a step S10040. In the step S10040, the processor 41000 registers the following information with the logical volume table 22300: an ID of the logical volume, for which the logical volume allocation instruction has been sent to the storage system 20000 in the step S10030; an ID of FB, for which the logical volume allocation instruction has been sent to the storage system 20000 in the step S10030; and a logical volume capacity. Subsequently, the procedure advances to a step S10050.

In the step S10050, the processor 41000 sends an instruction to the storage system 20000 for deleting, from the unallocated FB-ID field 22230 of the parity group table 22200 (cancelled with double lines), the ID of FB for which the logical volume allocation instruction has been sent to the storage system 20000 in the step S10030. Further, the processor 41000 sends an instruction to the storage system 20000 for registering a value with the allocatable capacity field 22240, which value is obtained by subtracting a value of a total capacity of FB deleted from the parity group table 22200 from a value of the allocatable capacity field 22240, and the procedure advances to a step S10060. In the step S10060, the processor 41000 returns a response to the logical volume creation request received in the step S10000 to the storage manager through the screen, and the program is terminated.

In the step S10020, when the value of the logical volume capacity received in the step S10000 is greater than the value of the logical volume-allocatable capacity obtained in the step S10010 (No in the step S10020) and it is determined that the logical volume is non-allocatable, the processor 41000 reports an error in the access request received in the step S10000 to the storage manager through the screen (step S10070), and the program is terminated. These are the operation of the processor 41000 using the logical volume allocation program 42200.

Next, as an overview of an operation of the storage system in Embodiment 1, a logical volume erasing process will be explained with reference to FIGS. 9 and 11.

Figure 9:
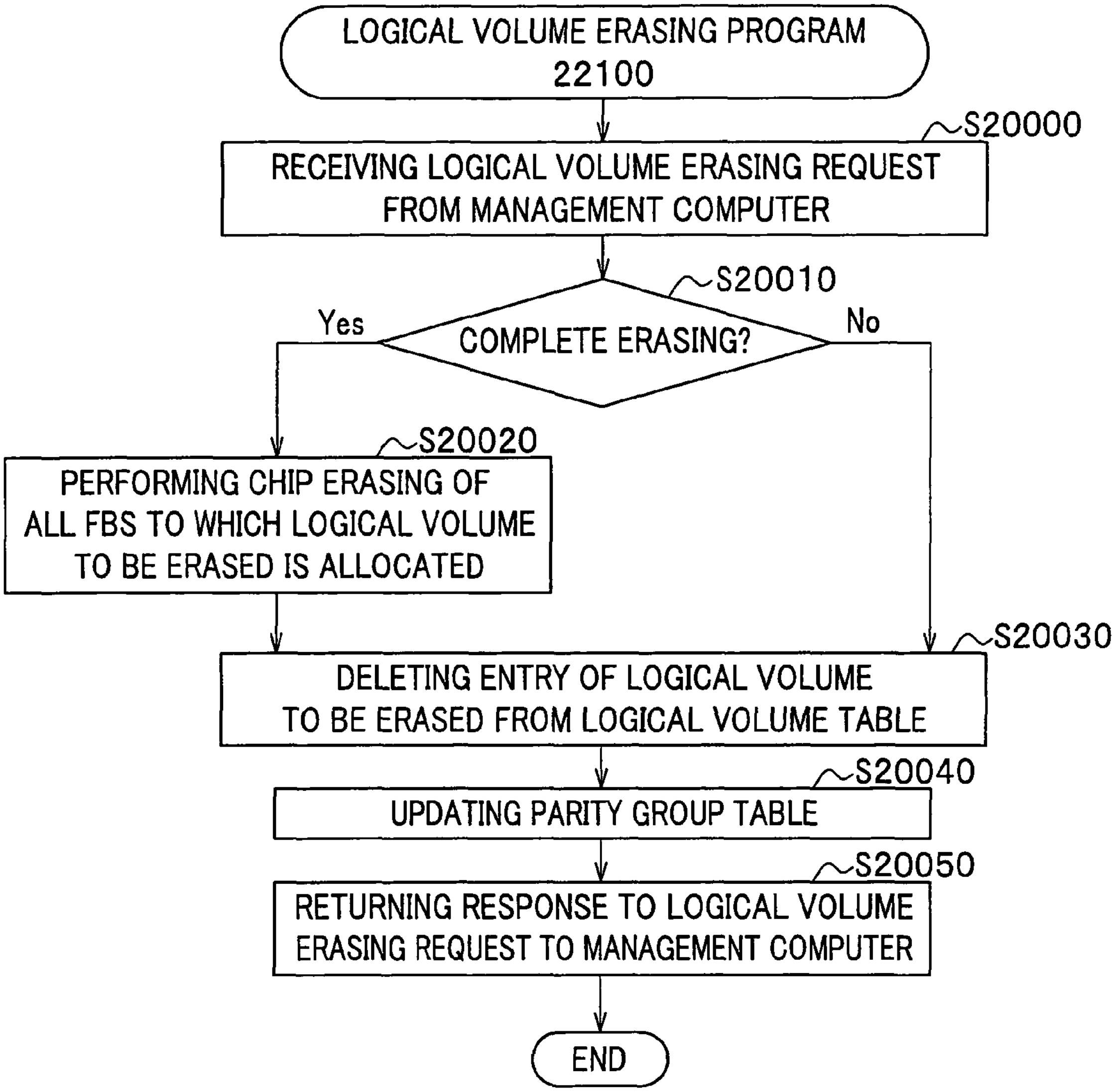
FIG. 9 is a flow chart showing an operation of a controller using a logical volume erasing program.

FIG. 9 is a flow chart showing an operation of a controller using a logical volume erasing program. FIG. 11 is an explanatory diagram showing an example of a logical volume erasing request screen displayed on an input unit of a management computer.

Figure 11:
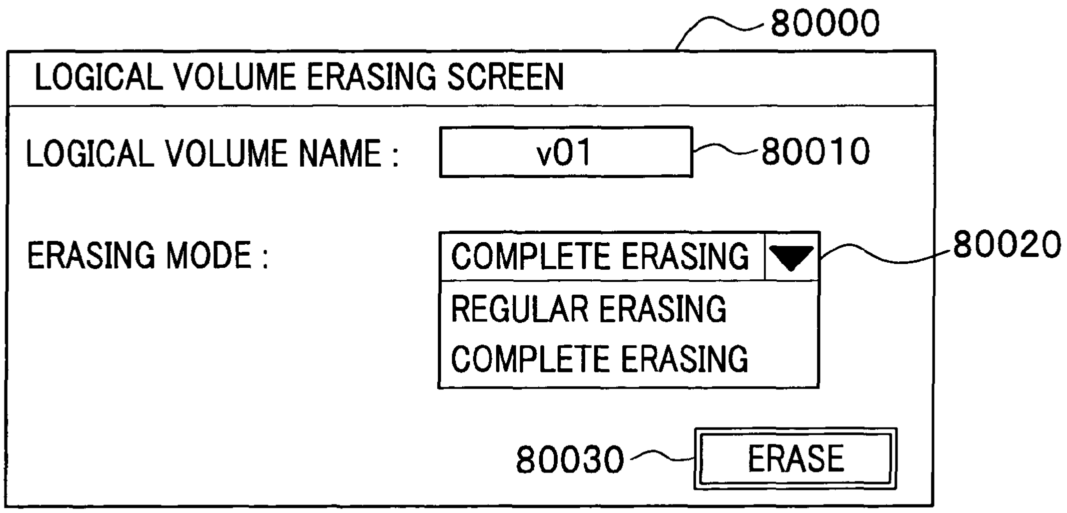
FIG. 11 is an explanatory diagram showing an example of a logical volume erasing request screen displayed on an input unit of a management computer.

Using an input-output program, the processor 41000 of the management computer 40000 displays a logical volume erasing screen 80000 as shown in FIG. 11. The logical volume erasing screen 80000 includes: a logical volume name input field 80010 for inputting a name of the logical volume to be erased; an erasing-mode selection pull-down menu 80020; and an erasing button 80030 for sending a logical volume erasing request to the storage system 20000. The erasing-mode selection pull-down menu 80020 shows a selection menu of a regular erasing and a complete erasing. In the regular erasing, an entry of the logical volume to be erased is deleted from the logical volume table 22300 without performing chip erasing of FB and the parity group table 22200 is updated; and in the complete erasing, chip erasing of FB is performed, an entry of the logical volume to be erased is deleted from the logical volume table 22300, and the parity group table 22200 is updated. The storage manager can select either of them.

In the present embodiment, the storage manager inputs data into the input field 80010, selects a mode from the pull-down menu 80020 and clicks the button 80030. For example, when the storage manager inputs a parameter shown in FIG. 11, selects the complete erasing as a logical volume erasing mode, and sends a logical volume erasing request, the controller 21000 of the storage system 20000 performs complete erasing of the logical volume v01.

First, in a step S20000 shown in FIG. 9, the controller 21000 receives a logical volume erasing request from the management computer 40000. The controller 21000 receives a logical volume erasing request including information, such as a name of the logical volume to be erased and an erasing mode from the management computer 40000, and the procedure advances to a step S20010.

In the step S20010, when the logical volume erasing request received in the step S20000 is complete erasing (Yes in the step S20010), the controller 21000 advances the procedure to a step S20020. In the step S20020, the controller 21000 performs chip erasing of FBs to which logical volume to be erased is allocated, in response to the logical volume erasing request received in the step S20000. The FB on which chip erasing is to be performed can be specified based on entry information, which was searched as an entry having ID of the logical volume to be erased, from entries registered in the logical volume-ID field 22310 of a logical volume table 22300. After performing the chip erasing of FB (step S20020), the controller 21000 deletes, from the logical volume table 22300, an entry having a logical volume-ID of the erased logical volume (step S20030).

Next in a step S20040, the controller 21000 adds FB-ID included in the entry that has been deleted from the logical volume table 22300 in the step S20030 to the unallocated FB-ID field 22230 of the parity group table 22200 (removes the double lines). Further, the processor 41000 registers a value with the allocatable capacity field 22240, which value is obtained by adding a value of the allocatable capacity field 22240 to a value of a total capacity of FB summed in the unallocated FB-ID field 22230 of the parity group table 22200, and the procedure advances to a step S20050. In the step S20050, the controller 21000 returns a response to the logical volume erasing request received in the step S20000 to the management computer 40000, and the program is terminated.

In the step S20010, when the logical volume erasing request received in the step S20000 is regular erasing (No in the step S20010), the controller 21000 advances the procedure to the step S20030. These are the operation of the controller 21000 using the logical volume erasing program 22100.

Figure 12:
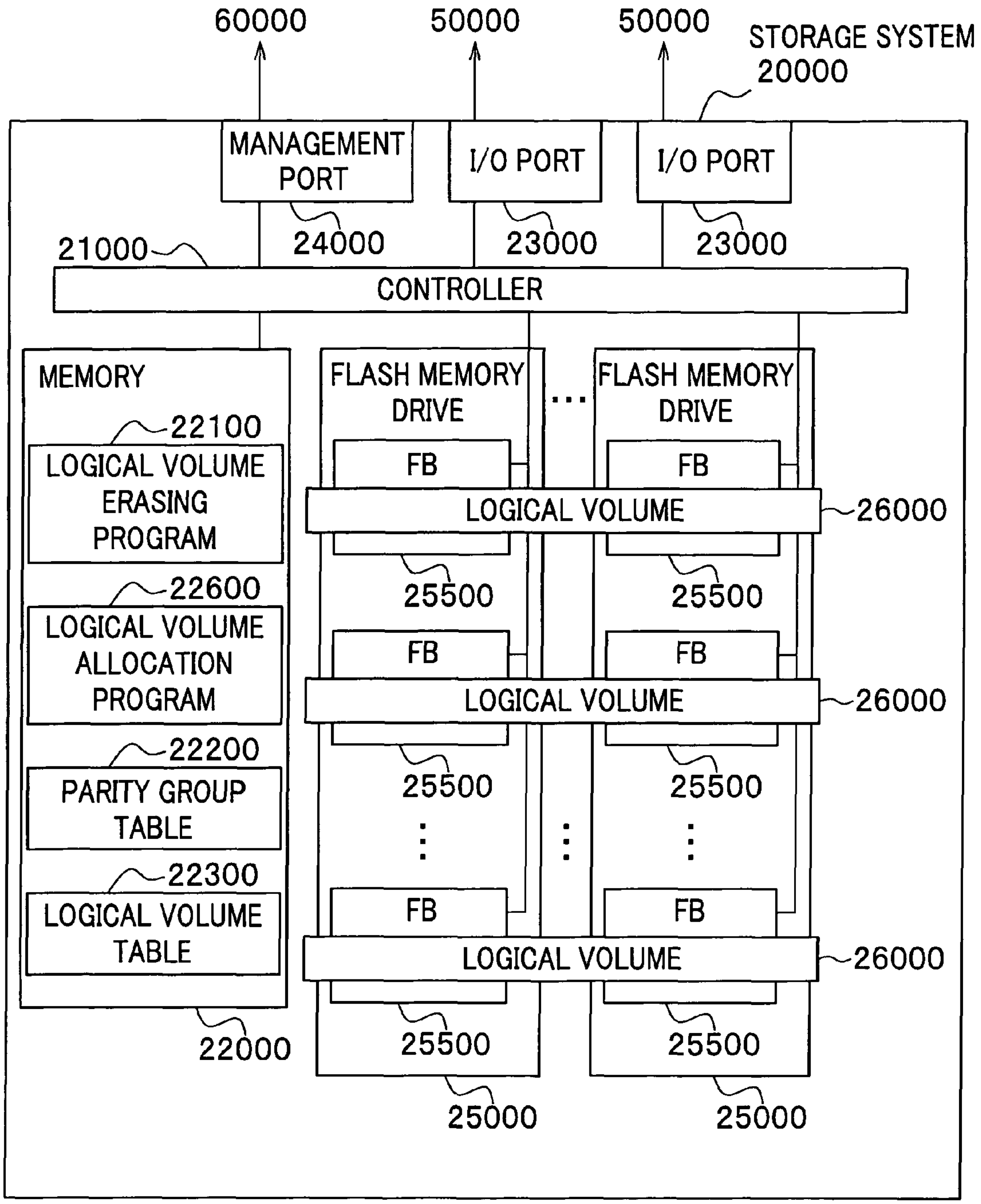
FIG. 12 is a block diagram showing another configuration of the storage system.

FIG. 12 is a block diagram showing another configuration of the storage system. The configuration in FIG. 12 is different from that in FIG. 2A in that the configuration further includes a logical volume allocation program 22600 on the memory 22000 of the storage system 20000. The logical volume allocation program 22600 performs substantially the same process as that of the logical volume allocation program 42200 stored on the memory 42000 of the management computer 40000 shown in FIG. 4. The controller 21000 of the storage system 20000 can perform substantially the same process as that of the logical volume allocation program 42200 by performing the logical volume allocation program 22600.

Figure 13:
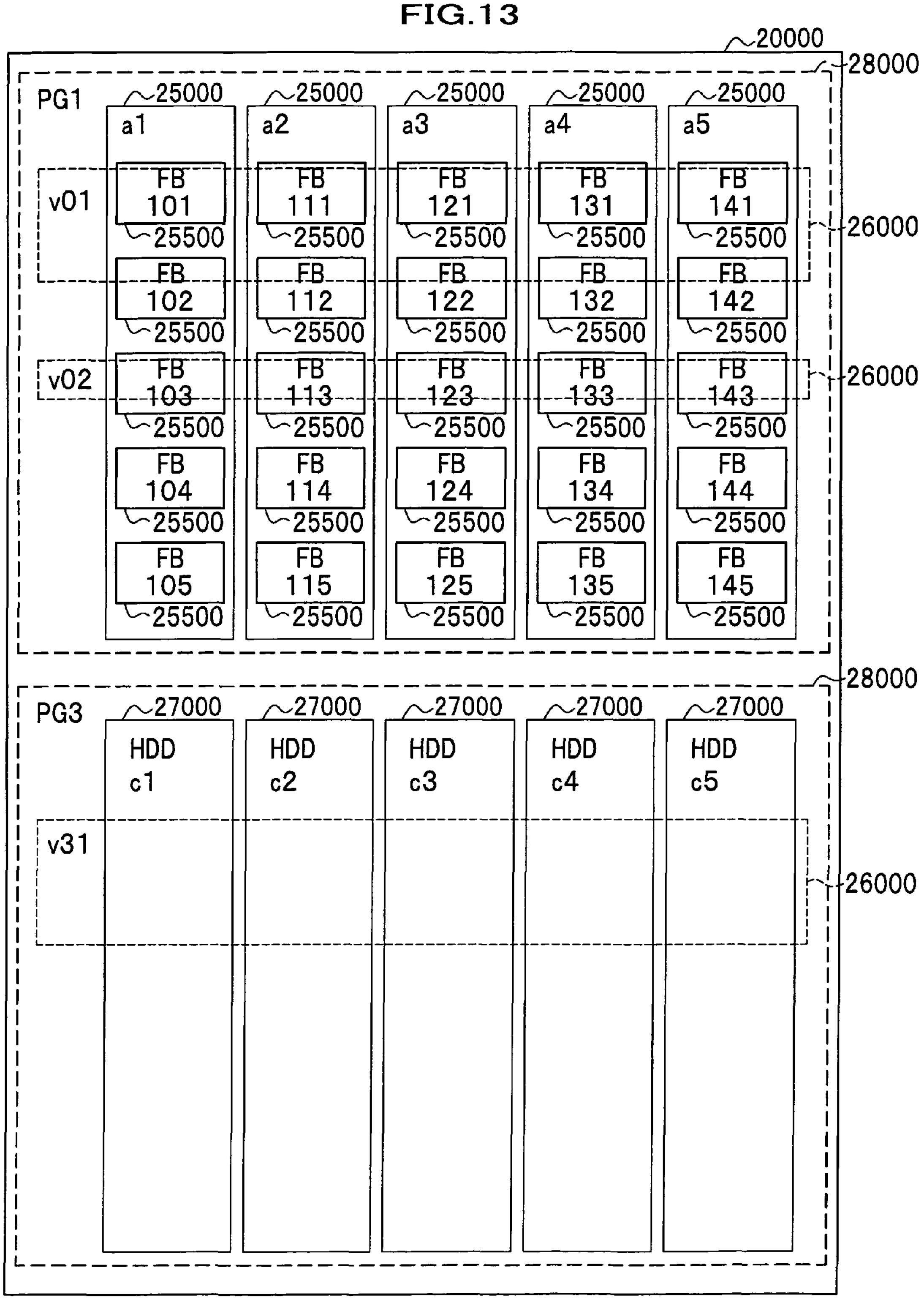
FIG. 13 is a configuration diagram showing the storage system having both flash memory drives and hard disk drives.

FIG. 13 is a configuration diagram showing the storage system having both flash memory drives and hard disk drives. A storage system 20000 has both a plurality of flash memory drives 25000 and a plurality of hard disk drives (hereinafter frequently and simply referred to as "HDD") 27000. v31, which is a logical volume 26000 belonging to a parity group PG3, is allocated to HDD c1, c2, c3, c4 and c5. In the storage system 20000 shown in FIG. 13, there may be a case in which a storage manager requests the process of the present embodiment. For example, when the storage manager desires to create a logical volume and prefers to make a time period for complete erasing of data on the logical volume as short as possible, the process of the present embodiment can be performed by utilizing the flash memory drive 25000 in the storage system 20000.

As explained above, according to Embodiment 1, when a logical volume is created on flash memory drives using the logical volume allocation program of the present embodiment, the logical volume is allocated while not only parity group information of the flash memory drives but also a flash memory chip border of the flash memory drives is taken into account. Specifically, when a table for managing a correlation between each parity group and the flash memory chip of the flash memory drive is obtained and the storage manager sends an instruction for creating a logical volume, the logical volume is allocated in such a manner that a flash memory chip is not shared by a plurality of logical volumes.

When the storage manager sends an instruction for performing complete erasing of logical volume data using the logical volume erasing program of the present embodiment, a management computer specifies a flash memory chip on which complete erasing of data is to be performed, and a storage system completely erases data exclusively on the chip of interest with a use of a chip erasing function of the flash memory. Therefore, a time period for performing complete erasing of data on logical volume on a flash memory drive can be reduced in the storage system. Moreover, when complete erasing of data is performed, overwriting of data is not repeated several times, and therefore, rewrite count on a flash memory can be reduced, leading to extension of a service life of a flash memory drive.

Embodiment 2

A configuration of a computer system according to Embodiment 2 of the present invention will be described with reference to FIGS. 14-17. It should be noted that, in the description of the computer system in Embodiment 2, only the differences from Embodiment 1 will be explained. In the configuration of the computer system in Embodiment 2, the same components as in Embodiment 1 are designated with the same reference characters, and a duplicate description is omitted. The configuration of the flash memory drive in Embodiment 2 is the same as that of the flash memory drive in Embodiment 1, and a duplicate description is omitted.

Figure 14:
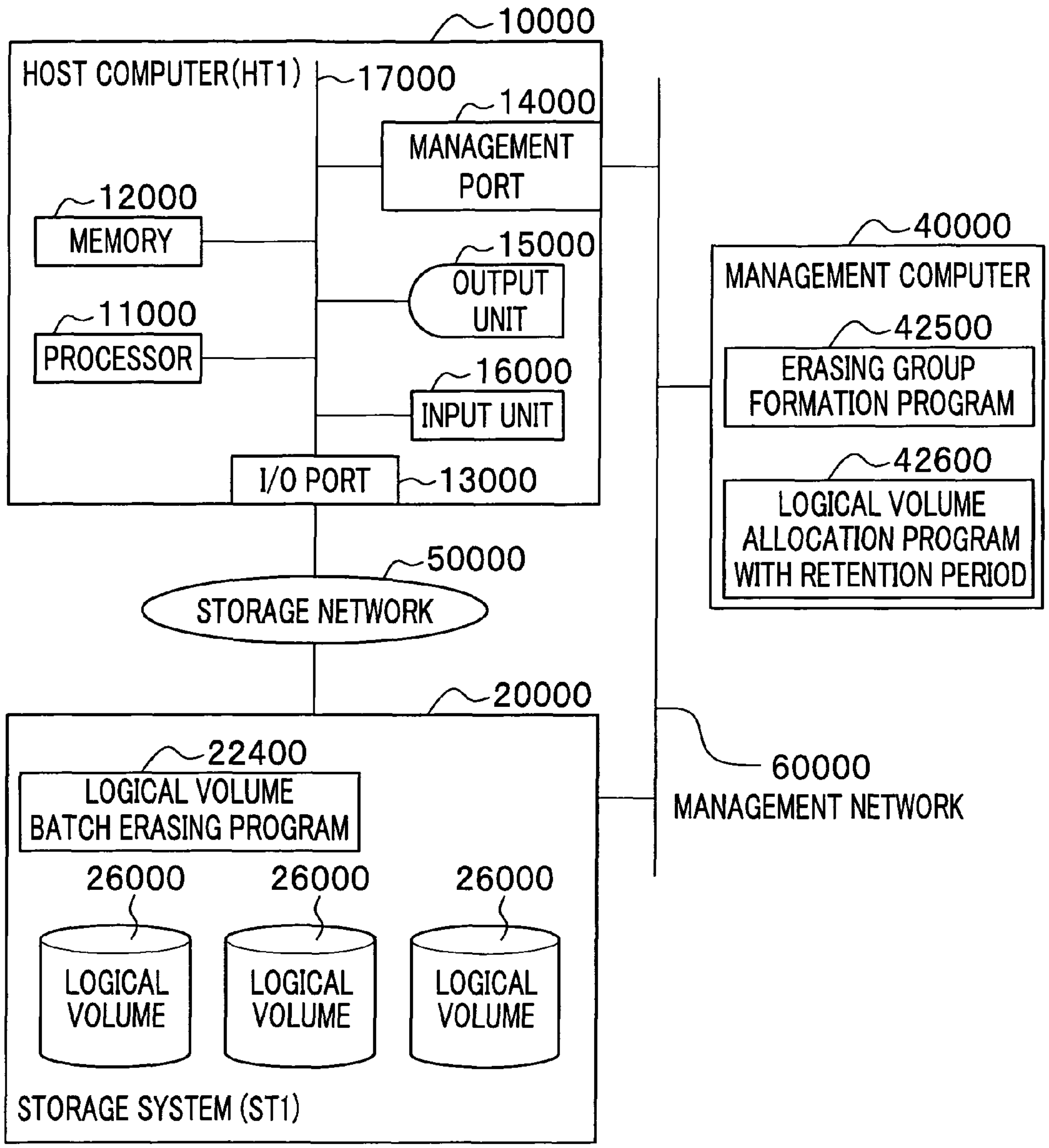
FIG. 14 is a block diagram showing a configuration of a computer system according to Embodiment 2.

FIG. 14 is a block diagram showing a configuration of a computer system according to Embodiment 2. Embodiment 2 shown in FIG. 14 is different from Embodiment 1 shown in FIG. 1 in that, instead of the logical volume allocation program 42200, an erasing group formation program 42500 and a logical volume allocation program with a limited retention period 42600 are included. The erasing group formation program 42500 defines an erasing group (SG) which is a group of FBs on which chip erasing is to be performed when the predetermined data retention period becomes expired. Another difference is that the storage system 20000, instead of the logical volume erasing program 22100, has a logical volume batch erasing program 22400 that performs chip erasing of FB which belongs to an erasing group, when the predetermined data retention period becomes expired. Details will be described later.

Figure 15:
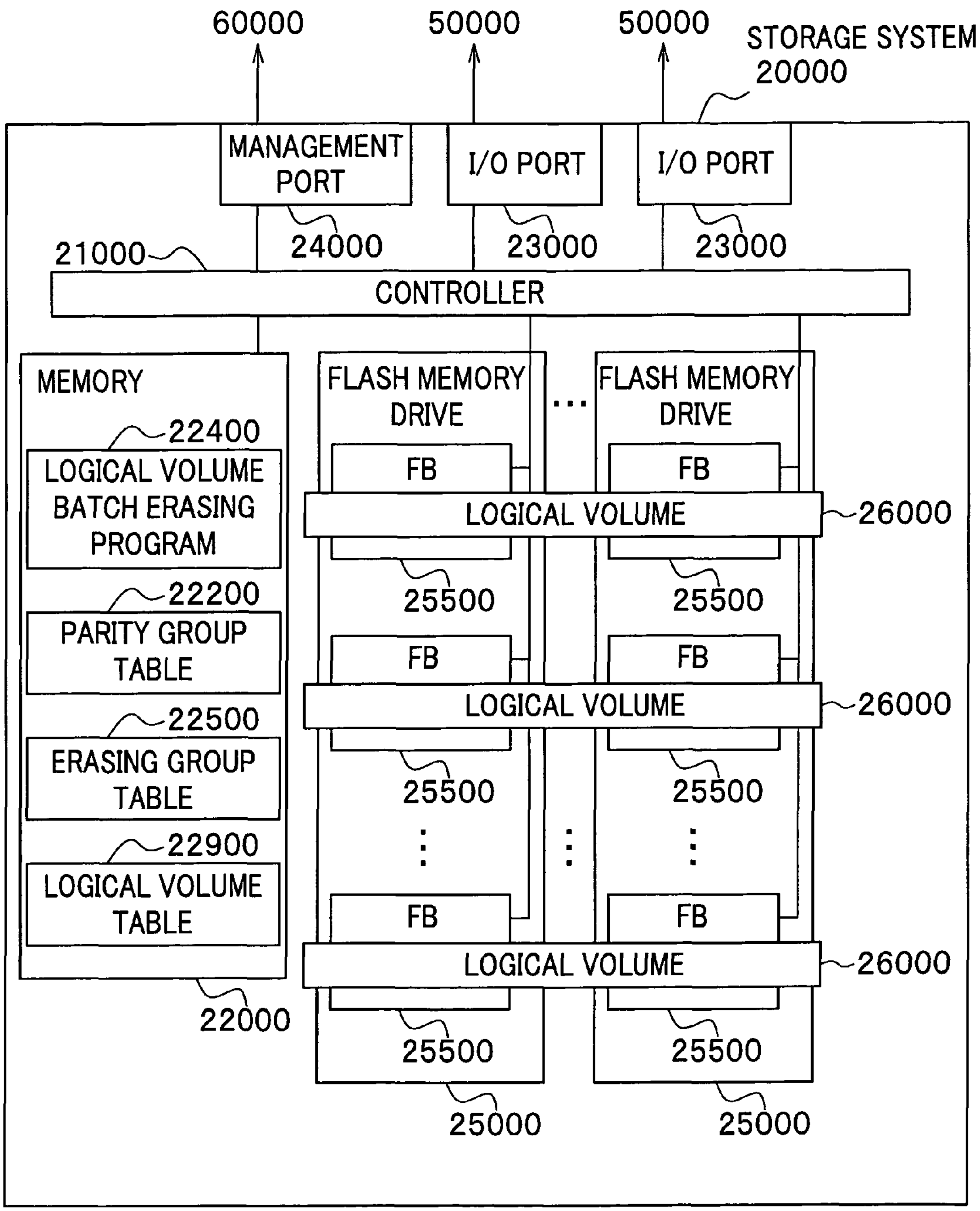
FIG. 15 is a block diagram showing a configuration of a storage system according to Embodiment 2.

FIG. 15 is a block diagram showing a configuration of a storage system according to Embodiment 2. Unlike Embodiment 1, the memory 22000 further includes a logical volume batch erasing program 22400, an erasing group table 22500 for managing a correlation between erasing group and FB, and a logical volume table 22900 for managing a correlation between logical volume and erasing group. The logical volume batch erasing program 22400, the erasing group table 22500 and the logical volume table 22900 as well are read from storage media (not shown), such as hard disk drives, when the storage system 20000 is started. An overview of an operation of the logical volume batch erasing program 22400 will be descried later. In addition, the erasing group table 22500 and the logical volume table 22900 will be described later.

Figure 16:
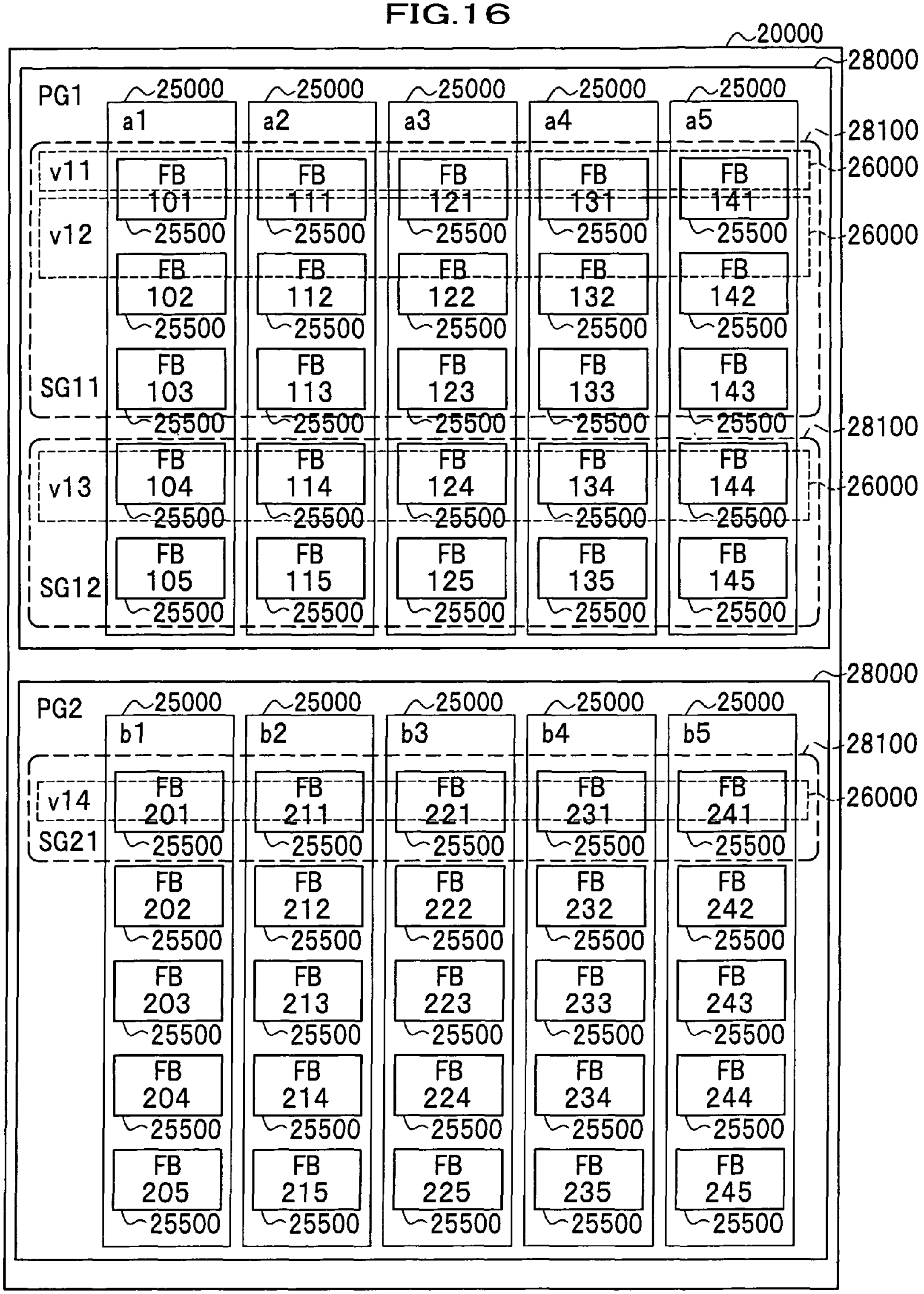
FIG. 16 is an explanatory diagram showing a relationship among flash memory blocks (FBs) included in each flash memory drive which belongs to a corresponding parity group, erasing groups to which the respective FBs belong, and logical volumes.

FIG. 16 is an explanatory diagram showing a relationship among flash memory blocks (FBs) included in each flash memory drive which belongs to a corresponding parity group, erasing groups to which the respective FBs belong, and logical volumes. FIG. 16 is different from FIG. 3 in that FIG. 16 further includes erasing groups 28100. For example, to an erasing group SG11 shown in FIG. 16, logical volumes v11, v12 among the logical volumes 26000 belong. The logical volume v11 is allocated to FB101, FB111, FB121, FB131 and FB141 among FBs 25500, and the logical volume v12 is allocated to FB101, FB102, FB111, FB112, FB121, FB122, FB131, FB132, FB141 and FB142 among FBs 25500. To an erasing group SG12, a logical volume v13 among logical volumes 26000 belongs. The logical volume v13 is allocated to FB104, FB114, FB124, FB134 and FB144 among FBs 25500. To an erasing group SG21, a logical volume v14 among logical volumes 26000 belongs. The logical volume v14 is allocated to FB201, FB211, FB221, FB231 and FB241 among FBs 25500. It should be noted that relationships among erasing group (SG), parity group (PG) and flash memory block (FB) will be described later in reference to FIG. 18. The relationship between logical volume and erasing group (SG) will be described later in reference to FIG. 19.

Figure 17:
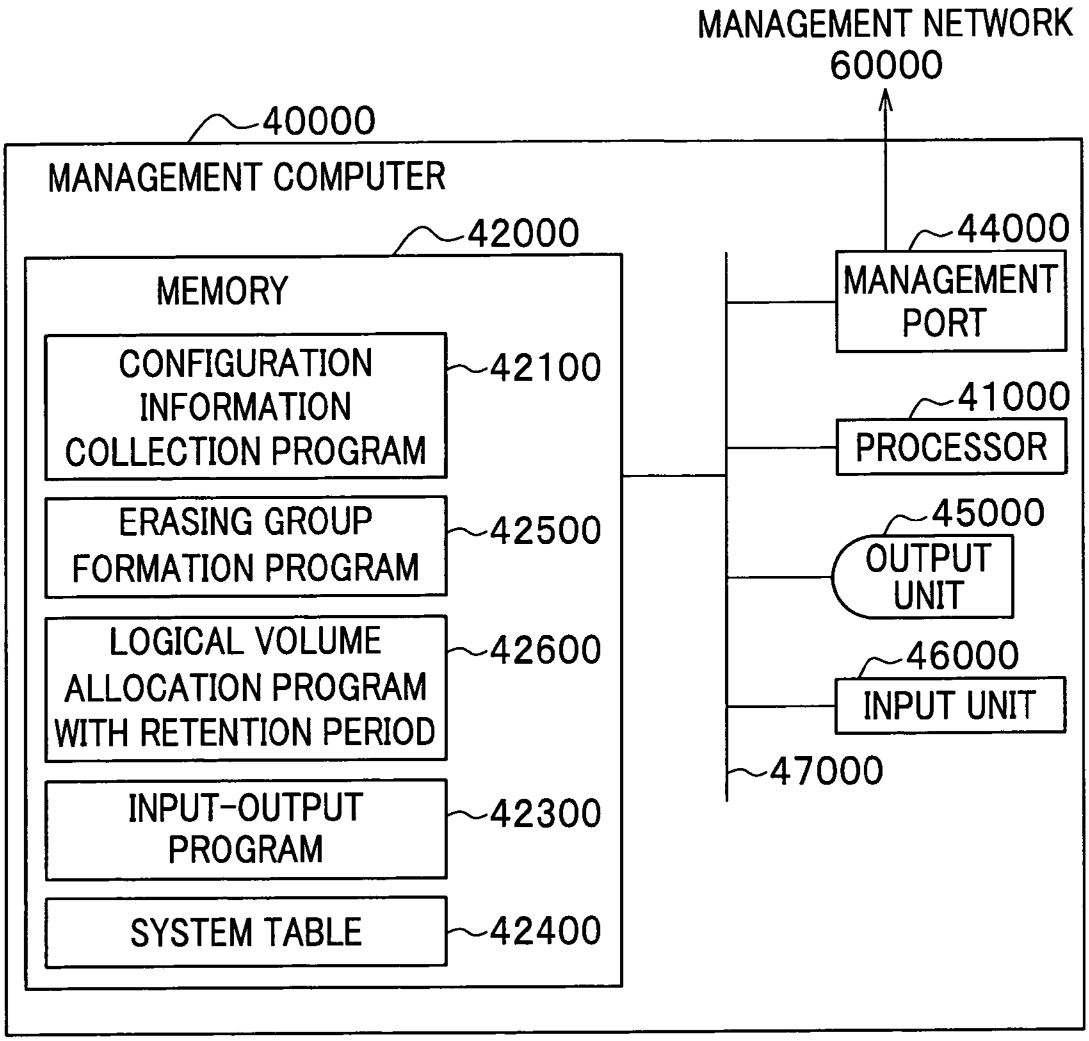
FIG. 17 is a block diagram showing a configuration of a management computer according to Embodiment 2.

FIG. 17 is a block diagram showing a configuration of a management computer according to Embodiment 2. Unlike Embodiment 1, the memory 42000 further includes an erasing group formation program 42500 and a logical volume allocation program with a limited retention period 42600. The erasing group formation program 42500 and the logical volume allocation program with a limited retention period 42600 are read from storage media (not shown), such as hard disk drives, onto the memory 42000, and executed by the processor 41000. The operation of the erasing group formation program 42500 and the operation of the logical volume allocation program with a limited retention period 42600 will be described later.

FIG. 18 is an explanatory diagram showing one example of an erasing group table that manages erasing groups in the storage system. The erasing group table 22500 includes: an SG-ID field 22510 for registering ID of SG as a unique identifier for the erasing group in the storage system 20000; a PG-ID field 22520 for registering ID of PG as a unique identifier for the parity group corresponding to the erasing group; an FB-ID field 22530 for registering ID of FB as a unique identifier for the FB which belongs to the erasing group; an allocatable capacity field 22540 for indicating a logical volume-unallocated capacity; and a retention period field 22550 for indicating a retention period of the erasing group.

Specifically in this embodiment, the erasing group SG11 which belongs to the parity group PG1 has an allocatable capacity of 30 GB in total, and a retention period of the erasing group is until 2007. Likewise, the erasing group SG12 which belongs to the parity group PG1 has an allocatable capacity of 20 GB in total, and a retention period of the erasing group is until 2008. The erasing group SG21 which belongs to the parity group PG2 has an allocatable capacity of 10 GB in total and a retention period of the erasing group is until 2009.

FIG. 19 is an explanatory diagram showing a logical volume table that manages logical volumes in the storage system. The logical volume table 22900 includes: a logical volume-ID field 22910 for registering ID of logical volume as a unique identifier for logical volume in the storage system 20000; an SG-ID field 22950 for registering ID of the erasing group corresponding to the logical volume; and a capacity field 22940 indicating a capacity of the logical volume.

Specifically, the logical volume v11 which belongs to the erasing group SG11 has a capacity of 10 GB. The logical volume v12 which belongs to the erasing group SG11 has a capacity of 20 GB. The logical volume v13 which belongs to the erasing group SG12 has a capacity of 20 GB. The logical volume v14 which belongs to the erasing group SG21 has a capacity of 10 GB. These are the configuration of the computer system of Embodiment 2.

Next, as an overview of an operation of the management computer in Embodiment 2, an erasing group formation process will be explained with reference to FIGS. 20 and 23.

Figure 20:
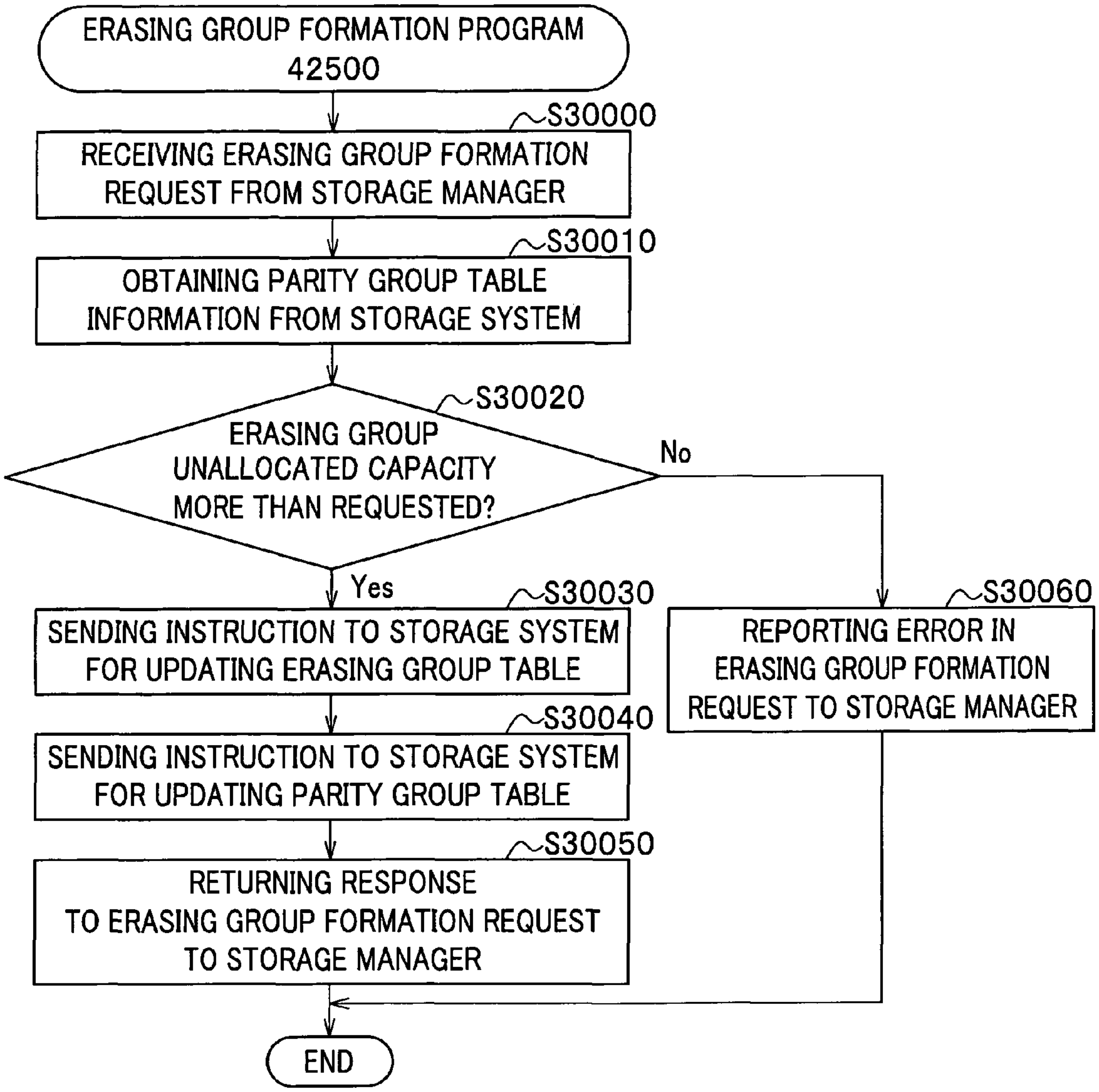
FIG. 20 is a flow chart showing the operation of a processor using an erasing group formation program.

FIG. 20 is a flow chart showing the operation of a processor using an erasing group formation program. FIG. 23 is an explanatory diagram showing an example of an erasing group formation screen of an input unit of a management computer.

Figure 23:
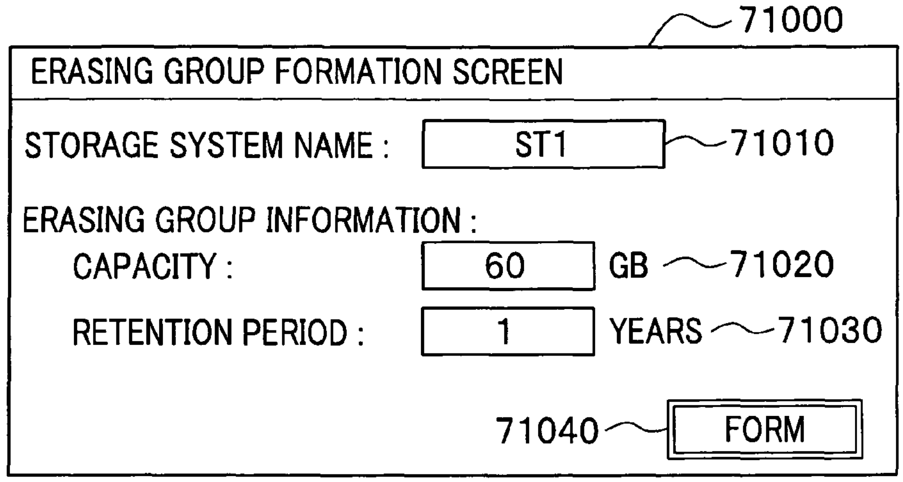
FIG. 23 is an explanatory diagram showing an example of an erasing group formation screen of an input unit of a management computer.

Using an input-output program, the processor 41000 displays an erasing group formation screen 71000 as shown in FIG. 23. The erasing group formation screen 71000 includes: a system name input field 71010 for inputting a storage system name in which erasing group is formed; a capacity input field 71020 for inputting a capacity of the erasing group; a retention period input field 71030 for inputting a retention period of the erasing group; and a FORM button 71040 for sending an erasing group formation request to the storage system 20000.

A storage manager inputs data into the input fields and clicks the button 71040. For example, when the storage manager input parameters shown in FIG. 23 to request an erasing group formation, the processor 41000 forms an erasing volume group having a capacity of 60 GB with a retention period of 1 year, in the storage system ST1.

First, in a step S30000 shown in FIG. 20, the processor 41000 of the management computer 40000 receives an erasing group formation request inputted by the storage manager. The processor 41000 receives an erasing group formation request including configuration information, such as storage system name and erasing group capacity, and the procedure advances to a step S30010. In the step S30010, the processor 41000 receives parity group table information including unallocated FB-IDs and an erasing group-formable capacity from the storage system 20000, and the procedure advances to a step S30020.

In the step S30020, the processor 41000 judges whether or not the erasing group having the capacity received in the step S30000 can be formed in the storage system 20000. In other words, the processor 41000 judges whether or not the erasing group has a capacity more than the requested capacity. In the step S30020, when the value of the erasing group capacity received in the step S30000 is equal to or smaller than the value of the erasing group-formable capacity obtained in the step S30010 (Yes in the step S30020), the erasing group is judged as being formable, and the processor 41000 advances the procedure to a step S30030. In the step S30030, the processor 41000 selects FBs corresponding to the erasing group capacity received in the step S30000 from the unallocated FB received in the step S30010, defines a group of selected FBs as an erasing group, and sends an instruction to the storage system 20000 for registering the defined erasing group with the erasing group table 22500 (an instruction for updating the erasing group table 22500), and the procedure advances to a step S30040.

In the step S30040, the processor 41000 sends an instruction to the storage system 20000 for deleting, from the unallocated FB-ID field 22230 of the parity group table 22200, the ID of FB registered with the erasing group in the step S30030. Further, the processor 41000 sends an instruction to the storage system 20000 for registering a value with the allocatable capacity field 22240 (an instruction for updating the parity group table 22200), which value is obtained by subtracting a value of a total capacity of FB deleted from the parity group table 22200 from a value of the allocatable capacity field 22240, and the procedure advances to a step S30050. In the step S30050, the processor 41000 returns a response to the erasing group formation request received in the step S30000 to the storage manager, and the program is terminated.

In the step S30020, when the value of the erasing group capacity received in the step S30000 is greater than the value of the erasing group-formable capacity obtained in the step S30010 (No in the step S30020) and it is determined that the erasing group cannot be formed, the processor 41000 reports an error in the erasing group formation request received in the step S30000 to the storage manager (step S30060), and the program is terminated. These are the operation of the processor 41000 using the erasing group formation program 42500.

Next, as an overview of an operation of the management computer in Embodiment 2, a logical volume allocation program with a limited retention period will be explained with reference to FIGS. 21 and 24.

Figure 21:
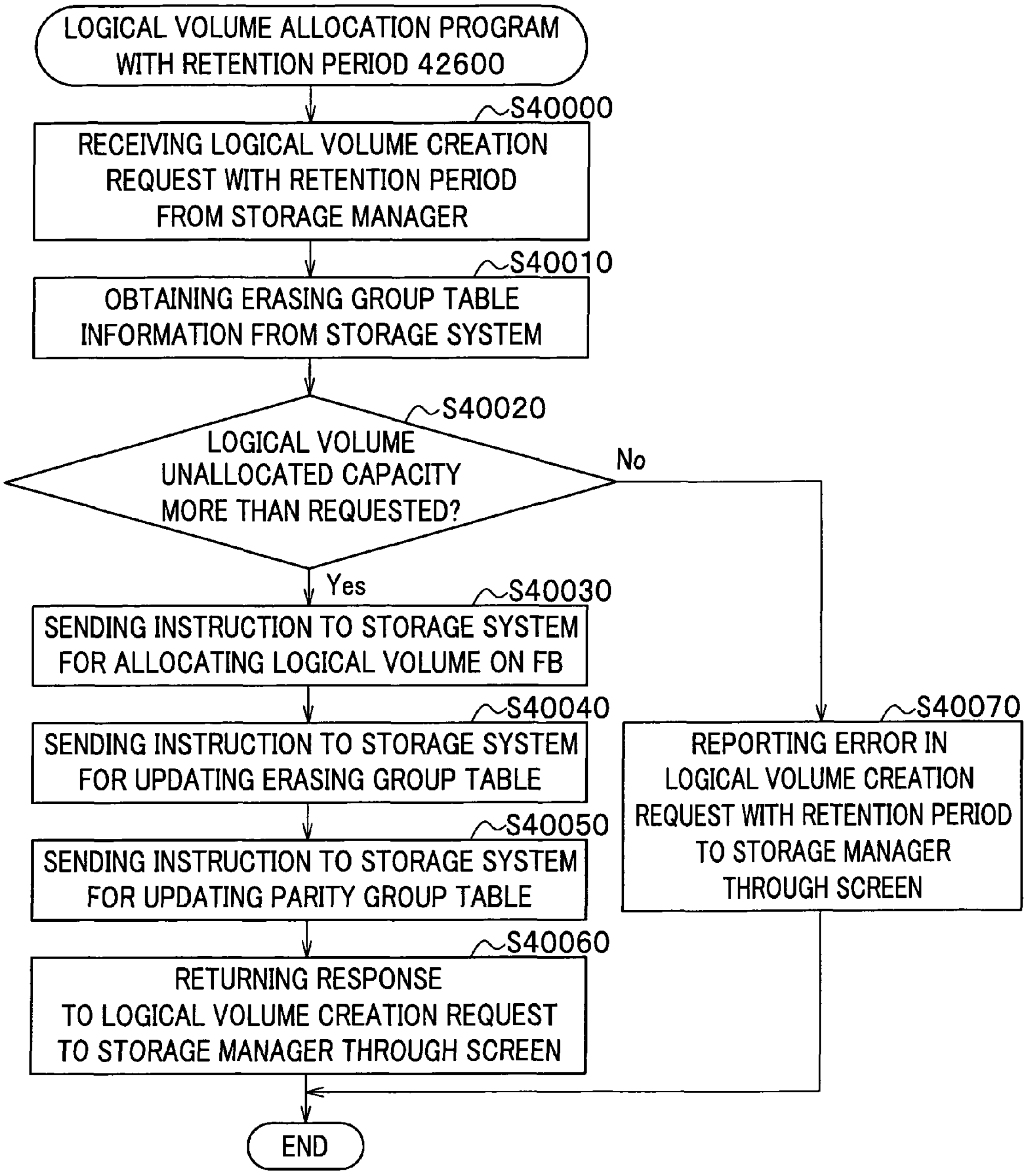
FIG. 21 is a flow chart showing an operation of the processor using a logical volume allocation program with a limited retention period.

FIG. 21 is a flow chart showing an operation of the processor using a logical volume allocation program with a limited retention period. FIG. 24 is an explanatory diagram showing an example of a screen of a logical volume creation with a limited retention period of an input unit of a management computer.

Figure 24:
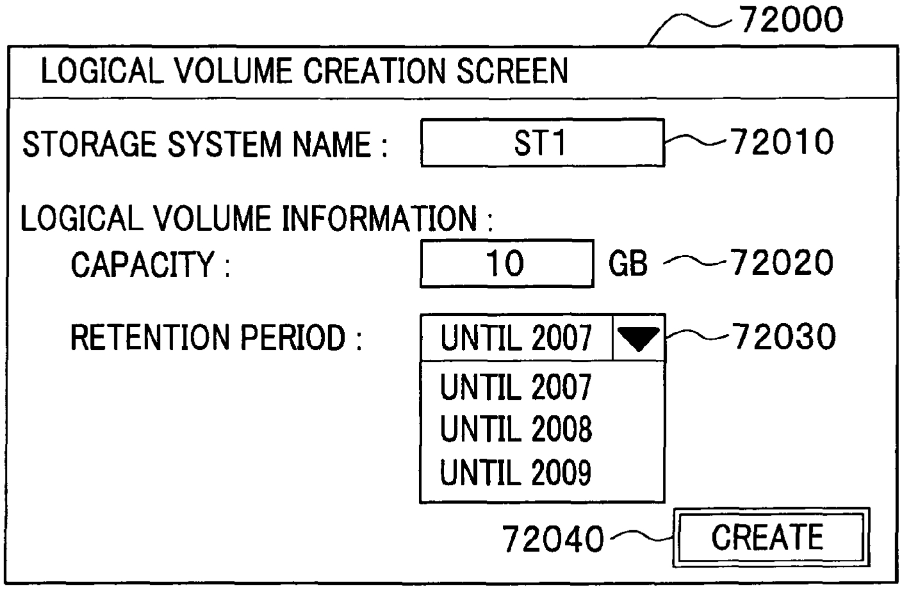
FIG. 24 is an explanatory diagram showing an example of a screen of a logical volume creation with a limited retention period of an input unit of a management computer.

Using an input-output program, the processor 41000 displays a screen of logical volume creation with a limited retention period 72000 as shown in FIG. 24. The screen of logical volume creation with a limited retention period 72000 includes: a system name input field 72010 for inputting a storage system name in which logical volume is created; a capacity input field 72020 for inputting a capacity of the logical volume; a pull-down menu 72030 for selecting a retention period of the logical volume; and a CREATE button 72040 for sending a request of logical volume creation with a limited retention period to the storage system 20000.

The storage manager inputs data into the input fields, selects a period from the pull-down menu 72030 and clicks the button 72040. For example, when the storage manager input parameters shown in FIG. 24 to request a logical volume creation, the processor 41000 creates a logical volume having a capacity of 10 GB with a retention period of until 2007, in the storage system ST1.

First, in a step S40000 shown in FIG. 21, the processor 41000 of the management computer 40000 receives a request of logical volume creation with a limited retention period, inputted by the storage manager. The processor 41000 receives a request of logical volume creation with a limited retention period including configuration information, such as storage system name and logical volume capacity, and the procedure advances to a step S40010. In the step S40010, the processor 41000 receives parity group table information including unallocated FB-IDs and logical volume-allocatable capacity from the storage system 20000, and the procedure advances to a step S40020.

In the step S40020, the processor 41000 judges whether or not the logical volume having the capacity received in the step S40000 is allocatable in the storage system 20000. In other words, the processor 41000 judges whether or not a capacity to which logical volume is not allocated is more than the requested capacity. In the step S40020, when the value of the logical volume capacity received in the step S40000 is equal to or smaller than the value of the logical volume-allocatable capacity obtained in the step S40010 (Yes in the step S40020), the logical volume is judged as being allocatable, and the processor 41000 advances the procedure to a step S40030. In the step S40030, the processor 41000 sends an instruction to the storage system 20000 for allocating the logical volume having the capacity received in the step S40000 to the unallocated FB received in the step S40010, and the procedure advances to a step S40040. In the step S40040, the processor 41000 sends an instruction to the storage system 20000 for registering the following information with the logical volume table 22900: an ID of the logical volume, for which the logical volume allocation instruction has been sent to the storage system 20000; an ID of FB, for which the logical volume allocation instruction has been sent in the step S40030; a logical volume capacity; and a retention period. Subsequently, the procedure advances to a step S40050.

In the step S40050, the processor 41000 sends an instruction to the storage system 20000 for registering a value with the allocatable capacity field 22540, which value is obtained by subtracting a value of a total capacity of FB deleted from the erasing group table 22500 from a value of the allocatable capacity field 22540, and the procedure advances to a step S40060. In the step S40060, the processor 41000 returns a response to the logical volume creation request received in the step S40000 to the storage manager through the screen, and the program is terminated.

In the step S40020, when the value of the logical volume capacity received in the step S40000 is greater than the value of the logical volume-allocatable capacity obtained in the step S40010 (No in the step S40020) and it is determined that the logical volume is non-allocatable, the processor 41000 reports an error in the logical volume creation request with a retention period received in the step S40000 to the storage manager through the screen (step S40070), and the program is terminated. These are the operation of the processor 41000 using the logical volume allocation program with a limited retention period 42600.

Next, as an overview of an operation of the storage system in Embodiment 2, a logical volume batch erasing process will be explained with reference to FIGS. 22 and 25.

Figure 22:
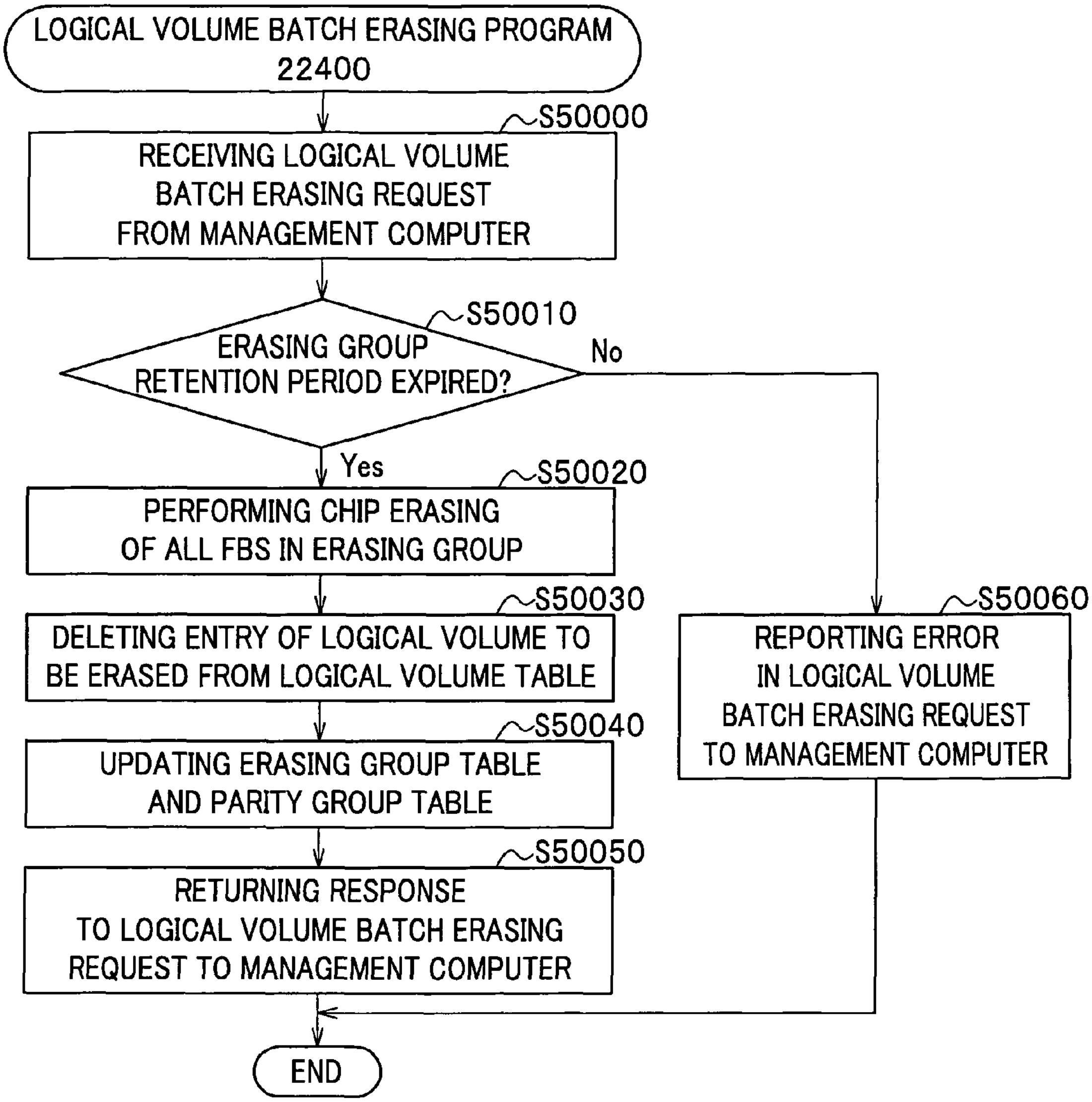
FIG. 22 is a flow chart showing an operation of a controller using a logical volume batch erasing program.

FIG. 22 is a flow chart showing an operation of a controller using a logical volume batch erasing program. FIG. 25 is an explanatory diagram showing an example of a logical volume batch erasing screen of an input unit of a management computer.

Figure 25:
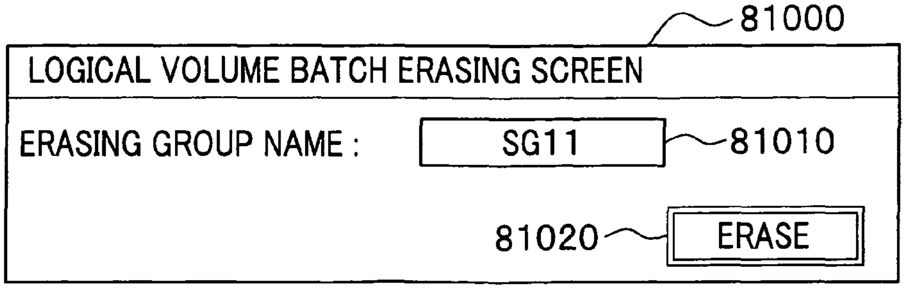
FIG. 25 is an explanatory diagram showing an example of a logical volume batch erasing screen of an input unit of a management computer.

Using an input-output program, the processor 41000 of the management computer 40000 displays a logical volume batch erasing screen 81000 as shown in FIG. 25. The logical volume batch erasing screen 81000 includes: an erasing group name input field 81010 for inputting a name of an erasing group including logical volumes to be erased at a time; and an erasing button 81020 for sending a logical volume batch erasing request to the storage system 20000 based on the value inputted in the erasing group name input field 81010.

A storage manager inputs data into the input field 81010 and clicks the button 81020. For example, when the storage manager inputs a parameter shown in FIG. 25 and sends a request for batch erasing of logical volume, the controller 21000 of the storage system 20000 performs complete erasing of the logical volume which belongs to the erasing group SG11.

First, in a step S50000, the controller 21000 receives a logical volume batch erasing request including name of erasing group to be erased at a time, from the management computer 40000, and the procedure advances to a step S50010.

In the step S50010, the controller 21000 judges whether or not the retention period of the erasing group received in the step S50000 becomes expired, by referring to the erasing group table 22500. In the step S50010, when the retention period of the erasing group received in the step S50000 becomes expired (Yes in the step S50010), the controller 21000 advances the procedure to a step S50020. In the step S50020, the controller 21000 performs chip erasing of all FBs which belongs to the erasing group received in the step S50000. The FB on which chip erasing is to be performed can be specified based on entry information, which was searched as an entry having ID of SG to be erased, from entries registered in the SG-ID field 22510 of the erasing group table 22500. After performing chip erasing of FB, the controller 21000 deletes, from the logical volume table 22900, an entry having a logical volume-ID of the erased logical volume (step S50030).

Next in a step S50040, the controller 21000 registers a value with the allocatable capacity field 22240, which value is obtained by adding a value of the allocatable capacity field 22540 of the erasing group table 22500 to a value of a total capacity of FB summed in the unallocated FB-ID field 22230 of the parity group table 22200 in the step S50030, and the procedure advances to a step S50050. In the step S50050, the controller 21000 returns a response to the logical volume batch erasing request received in the step S50000 to the management computer 40000, and the program is terminated.

In the step S50010, when the retention period of the erasing group received in the step S50000 is not expired (No in the step S50010) and it is determined that the logical volume batch erasing cannot be performed, the controller 21000 reports an error in the logical volume batch erasing request received in the step S50000 to the management computer 40000 (step S50060), and the program is terminated. These are the operation of the controller 21000 using the logical volume batch erasing program 22400.

Figure 26:
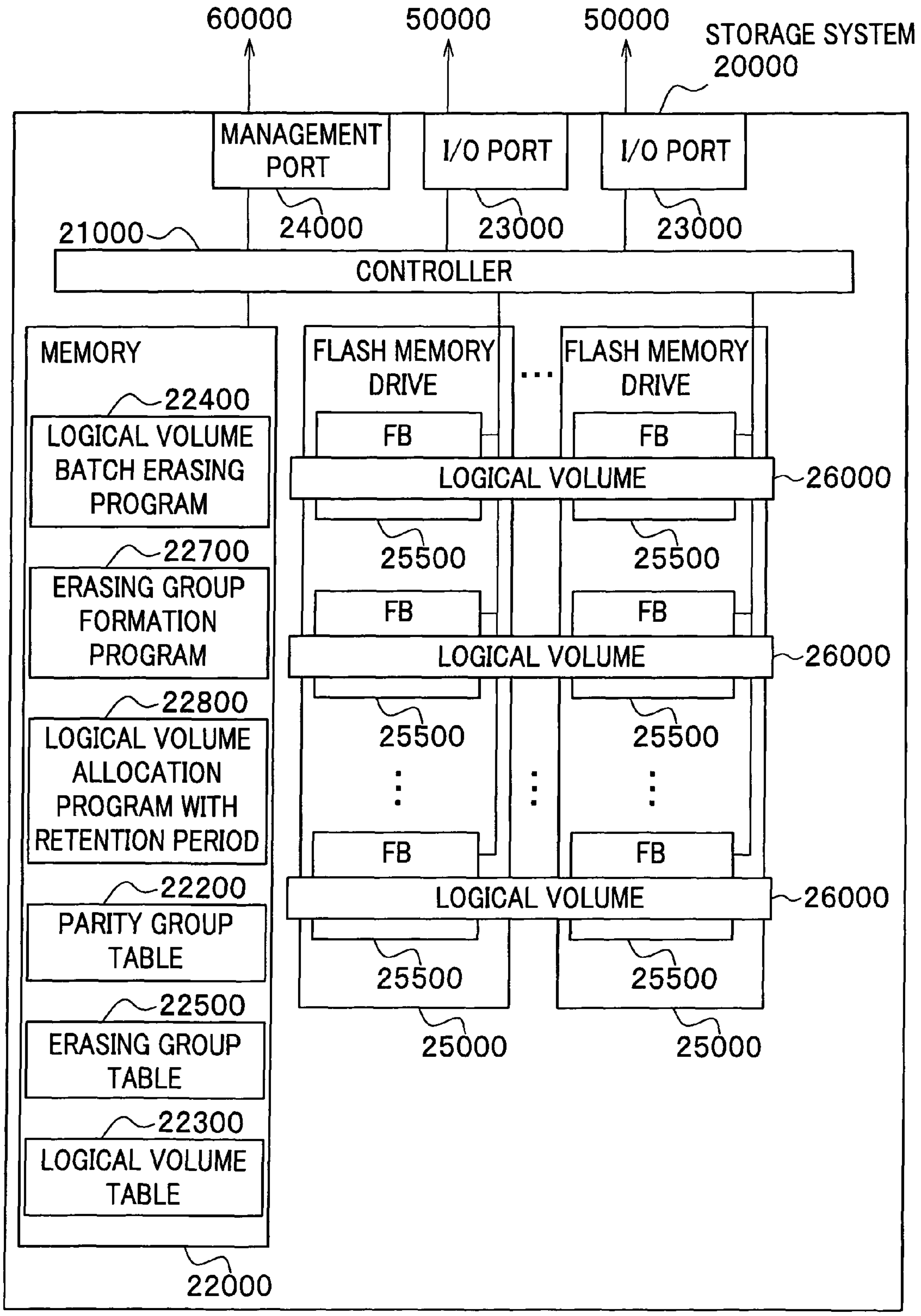
FIG. 26 is still a block diagram showing another configuration of the storage system.

FIG. 26 is still a block diagram showing another configuration of the storage system. The configuration in FIG. 26 is different from that in FIG. 15 in that the configuration further includes an erasing group formation program 22700 and a logical volume allocation program with a limited retention period 22800 stored on the memory 22000 of the storage system 20000. The erasing group formation program 22700 and the logical volume allocation program with a limited retention period 22800 perform substantially the same processes as those of the erasing group formation program 42500 and the logical volume allocation program with a limited retention period 42600 stored on the memory 42000 of the management computer 40000 as shown in FIG. 17. The controller 21000 of the storage system 20000 can perform substantially the same processes as those of the erasing group formation program 42500 and the logical volume allocation program with a limited retention period 42600 by performing the erasing group formation program 22700 and the logical volume allocation program with a limited retention period 22800.

Figure 27:
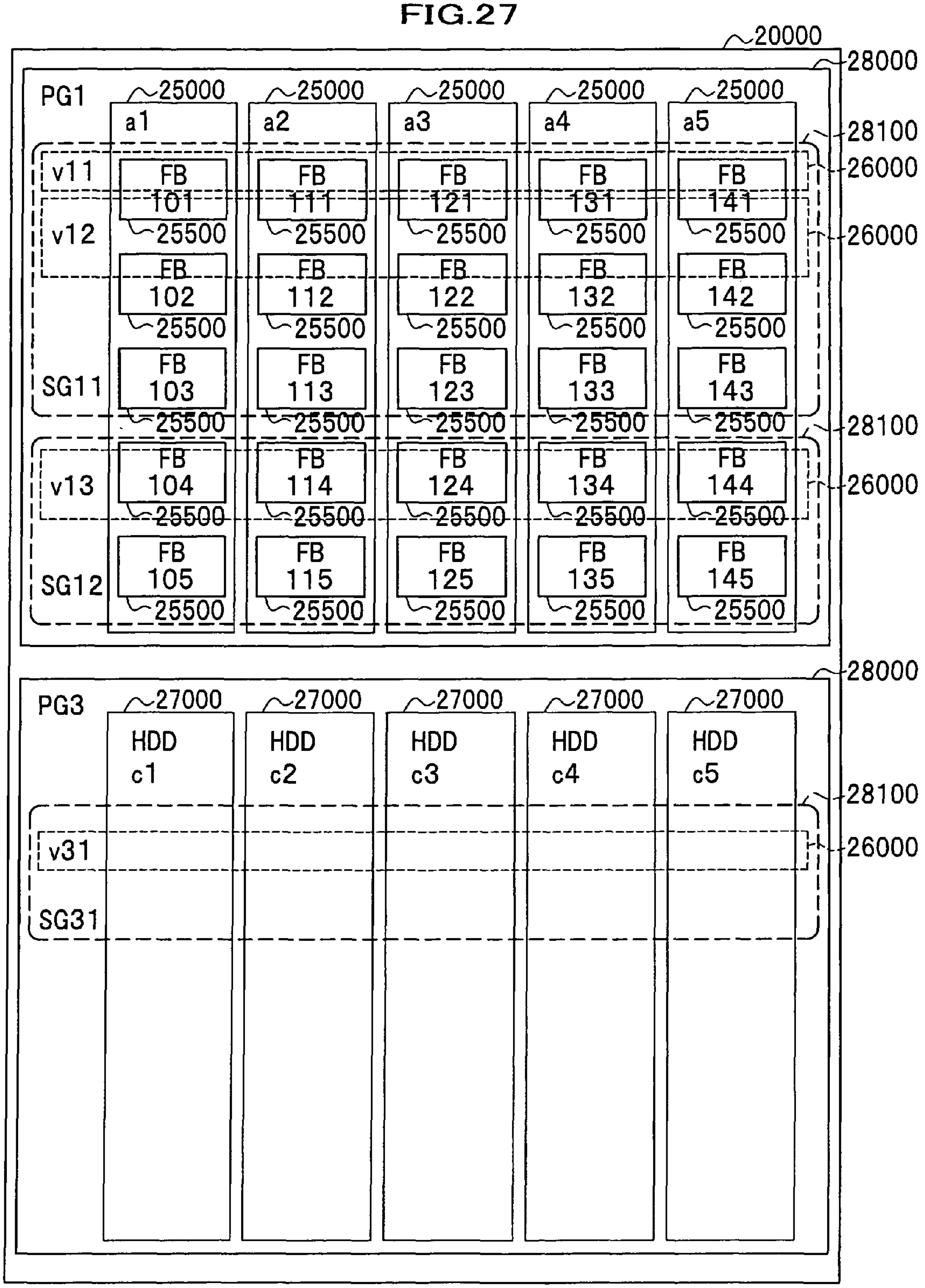
FIG. 27 is a diagram showing another configuration of the storage system having both flash memory drives and hard disk drives.

FIG. 27 is a diagram showing another configuration of the storage system having both flash memory drives and hard disk drives. A storage system 20000 has both a plurality of flash memory drives 25000 and a plurality of hard disk drives (HDDs) 27000. In the configuration shown in FIG. 27, an erasing group SG31 belongs to the parity group PG3 and formed of a plurality of HDDs 27000, specifically, HDDs c1, c2, c3, c4 and c5. v31, which is a logical volume 26000 belonging to the erasing group SG31 is allocated to HDDs c1, c2, c3, c4 and c5 among a plurality of HDDs 27000. In the storage system 20000 shown in FIG. 27, there may be a case in which a storage manager requests the process of the present embodiment. For example, when the storage manager desires to create a logical volume and prefers to make a time period for complete erasing of data on the logical volume as short as possible, the process of the present embodiment can be performed by utilizing the flash memory drive 25000 in the storage system 20000.

According to the storage system in Embodiment 2, a time period for performing complete erasing of data in logical volume on a flash memory drive can be reduced as compared with the conventional techniques. Moreover, according to the present storage system, when complete erasing of data is performed, rewrite count on a flash memory can be reduced, leading to extension of a service life of a flash memory drive as compared with the conventional techniques.

As explained above, according to Embodiment 2, when a logical volume is created on flash memory drives using the erasing group formation program and the logical volume allocation program with a limited retention period of the present embodiment, the logical volume is allocated while not only erasing group information of the flash memory drives but also a flash memory chip border of the flash memory drives is taken into account. Specifically, when a table for managing correlations among each parity group, erasing group and flash memory chip of the flash memory drive is obtained, and the storage manager sends an instruction for creating a logical volume, the logical volume is allocated in such a manner that a flash memory chip is not shared by a plurality of logical volumes.

When a storage manager sends an instruction for performing complete erasing of logical volume data using the logical volume batch erasing program of the present embodiment, a management computer specifies a flash memory chip on which complete erasing of data after expiration of a retention period is to be performed, and a storage system completely erases data exclusively on the chip of interest with a use of a chip erasing function of the flash memory. Therefore, a time period for performing complete erasing of data on logical volume on a flash memory drive can be reduced in the storage system. Moreover, when complete erasing of data is performed, overwriting of data is not repeated several times, and therefore, rewrite count on a flash memory can be reduced, leading to extension of a service life of a flash memory drive.

What is claimed is:

1. A computer system comprising:

a storage system comprising a controller and a plurality of flash memory devices, each of the plurality of flash memory devices including a plurality of flash memory chips configured as enable to erase data completely on a flash memory chip basis, wherein the controller controls to providing a plurality of logical volumes with the plurality of flash memory devices to a host computer, and controls to reading or writing data stored in the plurality of logical volumes in response to a request from the host computer; and a management computer managing relation information of the plurality of logical volumes and a plurality of parity groups of the plurality of flash memory devices, in which a total storage capacity of each parity group is calculated by unallocated flash memory chips of the plurality of flash memory chips corresponding to each parity group, wherein when the management computer receives a logical volume creation request to create a first logical volume, the management computer determines whether a storage capacity of the first logical volume is less than or equal to the total storage capacity of the unallocated flash memory chips, based on the relation information, and wherein when the storage capacity of the first logical volume is less than or equal to the total storage capacity of the unallocated flash memory chips, the management computer specifies one or more flash memory chips of the unallocated flash memory chips as dedicated flash memory chips for the first logical volume, and allocates the dedicated flash memory chips to the first logical volume of a first parity group of the flash memory devices based on the relation information so that the dedicated flash memory chips are not shared between the first logical volume and other logical volumes of the plurality of logical volumes.

2. The computer system according to claim 1, wherein when the storage system receives a complete erasing request to erase the first logical volume, the storage system performs complete data erasing on the dedicated flash memory chips corresponding to the first logical volume by using a complete data erasing function in order to reduce a total erase number of each of the dedicated flash memory chips.

3. The computer system according to claim 1, wherein when the storage system receives a regular erasing request by deleting an entry of the first logical volume from the relation information, the storage system cancels a correlation between the first logical volume and the dedicated flash memory chips corresponding to the first logical volume.

4. A storage system comprising:

a plurality of parity groups, each of the plurality of parity groups comprising a plurality of flash memory devices, and each of the plurality of flash memory devices comprising a plurality of flash memory chips configured as enable to erase data completely on a flash memory chip basis;

a controller that controls providing a plurality of logical volumes with the plurality of flash memory devices to a host computer, and controls reading or writing data stored in the plurality of logical volumes in response to a request from the host computer; and a memory that stores a parity group table that manages unallocated flash memory chips and a logical volume table that manages the plurality of logical volumes, wherein the parity group table comprises a field for registering an identifier of each of the plurality of parity groups, a field for registering an identifier of each of the plurality of flash memory devices corresponding to each respective parity group of the plurality of parity groups, a field for registering an identifier of each of the flash memory chips, which corresponds to each respective flash memory device of the plurality of flash memory devices, to which no logical volume is allocated, and a field for registering a total storage capacity for indicating a capacity of unallocated flash memory chips of the plurality of flash memory chips corresponding to each of the plurality of parity groups, wherein the logical volume table comprises a field for registering an identifier for each logical volume of the plurality of logical volumes, a field for registering each of the plurality of parity groups corresponding to each respective logical volume of the plurality of logical volumes, a field for registering an identifier of the flash memory chips to which each logical volume of the plurality of logical volumes is only allocated, and a field for registering a storage capacity that indicates a capacity of each of the plurality of logical volumes, and wherein when the host computer sends a logical volume creation request to create a first logical volume to a management computer, the volume creation request including the storage capacity of the first logical volume, the management computer obtains the total storage capacity of the unallocated flash memory chips from the parity group table, and the management computer determines whether the storage capacity of the first logical volume is less than or equal to the total storage capacity of the unallocated flash memory chips, and wherein when the storage capacity of the first logical volume is less than or equal to the total storage capacity of the unallocated flash memory chips, the management computer specifies one or more flash memory chips of the unallocated flash memory chips as dedicated flash memory chips for the first logical volume based on the parity group table, and allocates the dedicated flash memory chips to the first logical volume of a first parity group of the flash memory devices by registering identifiers of the dedicated flash memory chips to the first logical volume on the logical volume table, so that the dedicated flash memory chips are not shared between the first logical volume and other logical volume of the plurality of logical volumes.

5. The storage system according to claim 4, wherein when the controller receives a complete erasing request to erase the first logical volume from the host computer, the controller performs complete data erasing on the dedicated flash memory chips corresponding to the first logical volume by using a complete data erasing function in order to reduce a total erase number of each of the dedicated flash memory chips.

6. A storage system comprising:

a plurality of parity groups, each of the plurality of parity groups comprising a plurality of flash memory devices, and each of the plurality of flash memory devices comprising a plurality of flash memory chips configured as enable to erase data completely on a flash memory chip basis;

a controller that controls providing a plurality of logical volumes with the plurality of flash memory devices to a host computer, and controls reading or writing data stored in the plurality of logical volumes in response to a request from the host computer;

wherein each of the plurality of logical volumes belongs to a respective erasing group of a plurality of erasing groups; and a memory that stores a parity group table that manages unallocated flash memory chips, a logical volume table that manages the plurality of logical volumes, and an erasing group table that manages a correlation between the plurality of logical volumes and the plurality of erasing groups, wherein the parity group table comprises a field for registering an identifier of each of the plurality of parity groups, a field for registering an identifier of each of the plurality of flash memory devices corresponding to each respective parity group of the plurality of parity groups, a field for registering an identifier of each of the flash memory chips, which corresponds to each respective flash memory device of the plurality of flash memory devices, to which no logical volume is allocated, and a field for registering a total storage capacity for indicating a capacity of unallocated flash memory chips of the plurality of flash memory chips corresponding to each of the plurality of parity groups, wherein the erasing group table comprises a field for registering an identifier of each of the plurality of erasing groups, a field for registering an identifier of each respective parity group of the plurality of parity groups corresponding to each erasing group of the plurality of erasing groups, a field for registering an identifier of the flash memory chips of each erasing group of the plurality of erasing groups, in which the flash memory chips belonging to each erasing group are configured to be erased simultaneously, an allocatable capacity field for indicating a logical volume-unallocated capacity, and a retention period field for indicating a retention period of each erasing group, wherein the logical volume table comprises a field for registering an identifier for each logical volume of the plurality of logical volumes, a field for registering an identifier of each erasing group corresponding to each respective logical volume of the plurality of logical volumes, and a field for registering the storage capacity that indicate a capacity of each of the plurality of the logical volumes, wherein when the host computer sends a request to create a first logical volume with a limited retention period to a management computer, the request including the storage capacity of the first logical volume, the management computer obtains the total storage capacity of the unallocated flash memory chips from the parity group table, and the management computer determines whether the storage capacity of the first logical volume is less than or equal to the total storage capacity of the unallocated flash memory chips, and wherein when the storage capacity of the first logical volume is less than or equal to the total storage capacity of the unallocated flash memory chips, the management computer specifies one or more flash memory chips of the unallocated flash memory chips as dedicated flash memory chips for the first logical volume based on the parity group table, and allocates the dedicated flash memory chips to the first logical volume of a first parity group of the flash memory devices by registering identifiers of the dedicated flash memory chips to a the first logical volume of a first erasing group on the erasing group table, so that the dedicated flash memory chips of the first erase group are not shared between the first erasing group and other erasing groups of the plurality of erasing groups but can be shared between the first logical volume and other logical volumes belonging to the first erasing group, wherein the management computer sets the limited retention period received from the host computer to the first erasing group on the erasing group table.

7. The storage system according to claim 6, wherein when the controller receives a complete erasing request to erase the first erasing group from the host computer and determines that the retention period of the first erasing group expired, the controller performs complete data erasing on the dedicated flash memory chips corresponding to the first erasing group by using a complete data erasing function in order to reduce a total erase number of each of the dedicated flash memory chips.

8. The storage system according to claim 6, wherein when the host computer sends a request to create a second logical volume with the limited retention period of the first erasing group to a management computer, the request including the storage capacity of the second logical volume, the management computer obtains the total storage capacity of the unallocated flash memory chips from the parity group table, and the management computer determines whether the storage capacity of the second logical volume is less than or equal to the total storage capacity of the unallocated flash memory chips, and wherein when the storage capacity of the second logical volume is less than or equal to the total storage capacity of the unallocated flash memory chips, the management computer specifies one or more flash memory chips of the unallocated flash memory chips as dedicated flash memory chips for the second logical volume based on the parity group table, and allocates the dedicated flash memory chips to the second logical volume of a first parity group of the flash memory devices by registering identifiers of the dedicated flash memory chips to a the second logical volume of a first erasing group on the erasing group table, so that the dedicated flash memory chips of the first erasing group are not shared between the first erasing group and other erasing groups of the plurality of erasing groups but can be shared between the first logical volume and the second logical volume belonging to the first erasing group.

* * * * *